US012674868B2

(12) United States Patent
Rekow et al.

(10) Patent No.: US 12,674,868 B2
(45) Date of Patent: Jul. 7, 2026

(54) LIDAR SYSTEM HAVING A LINEAR FOCAL PLANE, AND RELATED METHODS AND APPARATUS

(71) Applicant: VELODYNE LIDAR USA, INC., San Jose, CA (US)

(72) Inventors: Mathew Noel Rekow, Ben Lomond, CA (US); Stefan Pfnuer, San Jose, CA (US)

(73) Assignee: Velodyne Lidar USA, Inc., San Jose, CA (US)

( * ) Notice: Subject to any disclaimer, the term of this patent is extended or adjusted under 35 U.S.C. 154(b) by 1062 days.

(21) Appl. No.: 17/567,004

(22) Filed: Dec. 31, 2021

(65) Prior Publication Data

US 2023/0213618 A1      Jul. 6, 2023

(51) Int. Cl.
*G01S 7/481*        (2006.01)
*G01S 7/4863*       (2020.01)
(Continued)

(52) U.S. Cl.
CPC .......... *G01S 7/4811* (2013.01); *G01S 7/4863* (2013.01); *G01S 7/497* (2013.01); *G01S 17/08* (2013.01)

(58) Field of Classification Search
CPC ...... G01S 7/4811; G01S 7/4863; G01S 7/497; G01S 17/08
See application file for complete search history.

(56) References Cited

U.S. PATENT DOCUMENTS

| | | | |
|---|---|---|---|
| 6,339,503 B1 * | 1/2002 | Derstine | G02B 3/0062 |
| | | | 359/663 |
| 6,339,506 B1 * | 1/2002 | Wakelin | G02B 27/0025 |
| | | | 359/648 |

(Continued)

FOREIGN PATENT DOCUMENTS

| | | | | |
|---|---|---|---|---|
| EP | 3789787 A1 * | 3/2021 | | G01S 7/483 |
| WO | WO-03005085 A1 * | 1/2003 | | G02B 6/3885 |

(Continued)

OTHER PUBLICATIONS

PCT/US2022/054360, "International Preliminary Report on Patentability", Jul. 11, 2024, 10 pages.

(Continued)

*Primary Examiner* — Isam A Alsomiri
*Assistant Examiner* — Benjamin Wade Clouser
(74) *Attorney, Agent, or Firm* — Kilpatrick Townsend & Stockton LLP

(57)        ABSTRACT

A light detection and ranging (LIDAR) device including a plurality of laser sources configured to provide a plurality of transmit beams, each laser source being positioned with a respective offset of a first plurality of offsets relative to a reference line, a plurality of transmit/receive (T/R) interfaces configured to pass the plurality of transmit beams and reflect received light towards a plurality of detectors, each T/R interface being positioned with a respective offset of a second plurality of offsets relative to the reference line, and a plurality of lenses positioned between the plurality of laser sources and the plurality of T/R interfaces, each lens being positioned with a respective offset of a third plurality of offsets relative to the reference line, wherein the plurality of laser sources and the plurality of lenses, as positioned, are configured to provide beam-steering of the plurality of transmit beams.

35 Claims, 24 Drawing Sheets

(51) Int. Cl.
    *G01S 7/497*       (2006.01)
    *G01S 17/08*       (2006.01)

(56) References Cited

U.S. PATENT DOCUMENTS

| | | | |
|---|---|---|---|
| 6,353,502 B1 * | 3/2002 | Marchant | G02B 3/0056 |
| | | | 359/619 |
| 6,722,788 B2 | 4/2004 | Kang et al. | |
| 9,671,576 B1 * | 6/2017 | Tong | G02B 6/4226 |
| 10,447,973 B2 | 10/2019 | Droz et al. | |
| 10,756,839 B1 * | 8/2020 | Cheung | H04J 14/0256 |
| 10,890,650 B2 | 1/2021 | Droz et al. | |
| 11,105,899 B2 * | 8/2021 | Burroughs | G01J 1/44 |
| 11,428,788 B2 * | 8/2022 | Shi | G01S 17/42 |
| 11,662,467 B2 * | 5/2023 | Shani | G01S 17/10 |
| | | | 356/5.01 |
| 2003/0072524 A1 | 4/2003 | Kang et al. | |
| 2010/0046953 A1 * | 2/2010 | Shaw | H01S 5/423 |
| | | | 398/115 |
| 2017/0090032 A1 | 3/2017 | Ridderbusch | |
| 2018/0164439 A1 | 6/2018 | Droz et al. | |
| 2018/0188359 A1 | 7/2018 | Droz et al. | |
| 2018/0267148 A1 | 9/2018 | Buettner et al. | |
| 2019/0052844 A1 * | 2/2019 | Droz | G01S 17/931 |
| 2019/0072649 A1 | 3/2019 | Droz et al. | |
| 2020/0169701 A1 | 5/2020 | Droz et al. | |
| 2021/0247498 A1 | 8/2021 | Shi et al. | |
| 2022/0052511 A1 * | 2/2022 | Lu | G02B 6/42 |

FOREIGN PATENT DOCUMENTS

| | | | | |
|---|---|---|---|---|
| WO | WO-2014175901 A1 * | 10/2014 | | H05B 45/14 |
| WO | WO-2019050644 A1 * | 3/2019 | | G01S 7/4914 |
| WO | 2020135802 A1 | 7/2020 | | |

OTHER PUBLICATIONS

PCT/US2022/054360, "International Search Report and the Written Opinion", Apr. 13, 2023, 12 pages.

U.S. Appl. No. 17/567,005, "Non-Final Office Action", Jun. 18, 2025, 7 pages.

U.S. Appl. No. 17/567,005, "Notice of Allowance", Feb. 9, 2026, 9 pages.

* cited by examiner

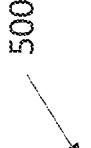
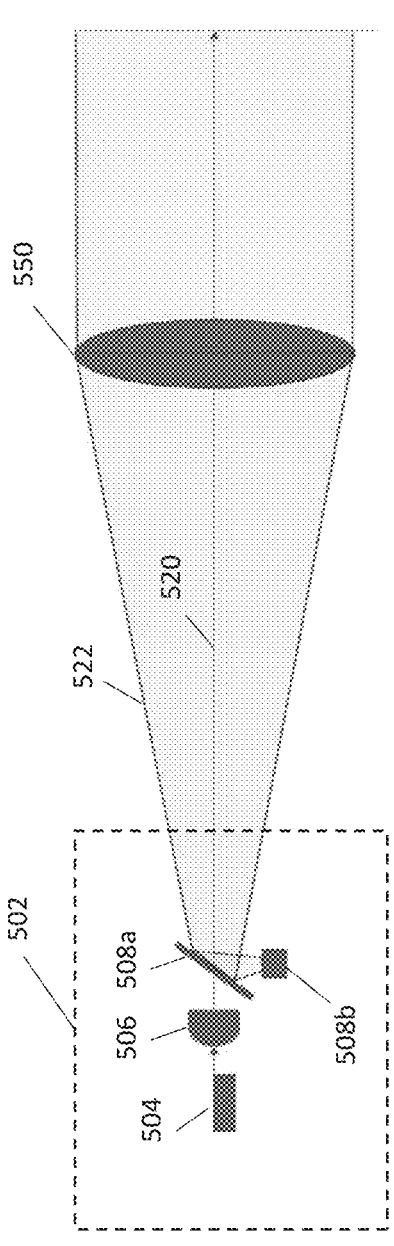
FIG. 5

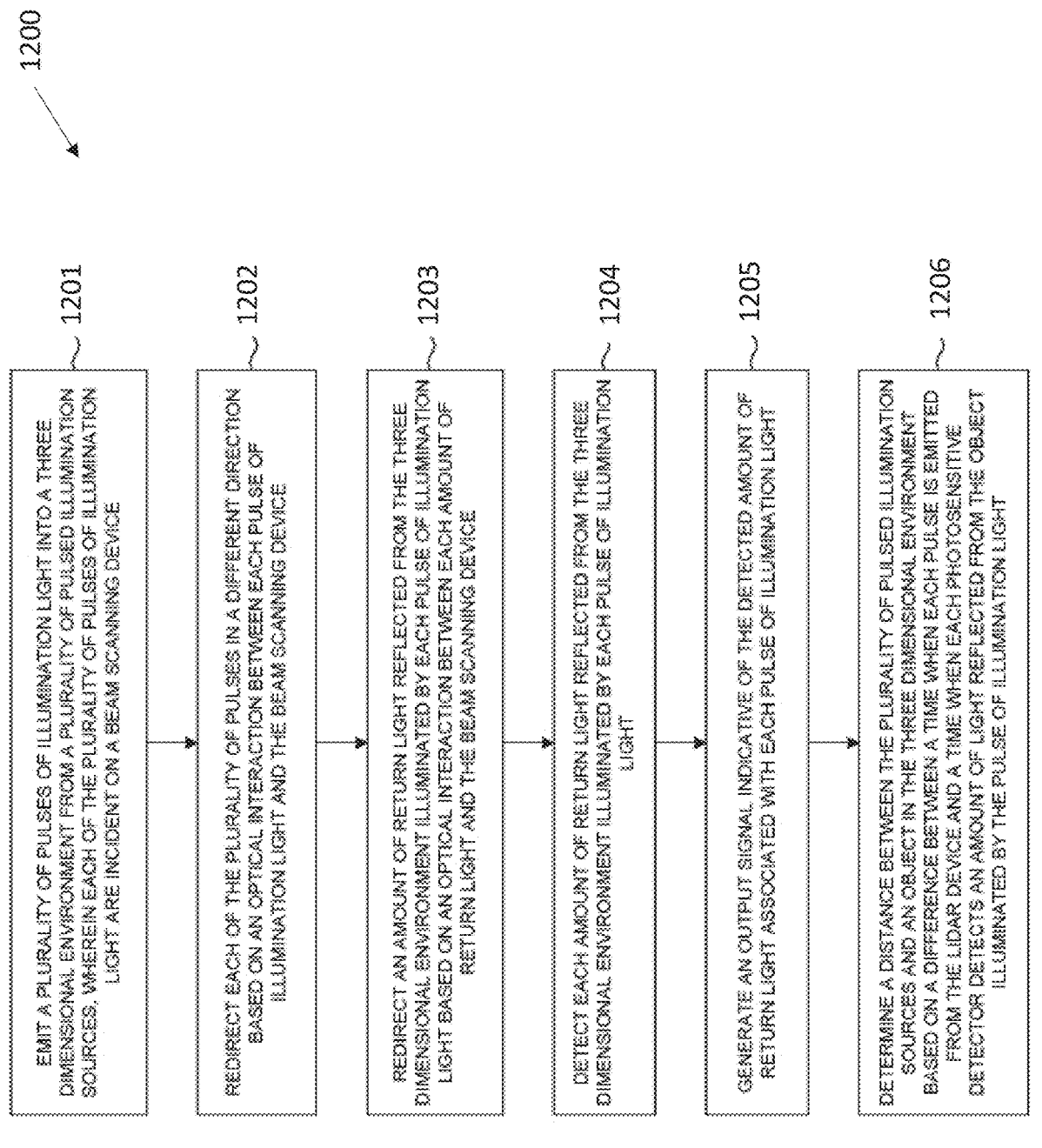

1200

1201 EMIT A PLURALITY OF PULSES OF ILLUMINATION LIGHT INTO A THREE DIMENSIONAL ENVIRONMENT FROM A PLURALITY OF PULSED ILLUMINATION SOURCES, WHEREIN EACH OF THE PLURALITY OF PULSES OF ILLUMINATION LIGHT ARE INCIDENT ON A BEAM SCANNING DEVICE

1202 REDIRECT EACH OF THE PLURALITY OF PULSES IN A DIFFERENT DIRECTION BASED ON AN OPTICAL INTERACTION BETWEEN EACH PULSE OF ILLUMINATION LIGHT AND THE BEAM SCANNING DEVICE

1203 REDIRECT AN AMOUNT OF RETURN LIGHT REFLECTED FROM THE THREE DIMENSIONAL ENVIRONMENT ILLUMINATED BY EACH PULSE OF ILLUMINATION LIGHT BASED ON AN OPTICAL INTERACTION BETWEEN EACH AMOUNT OF RETURN LIGHT AND THE BEAM SCANNING DEVICE

1204 DETECT EACH AMOUNT OF RETURN LIGHT REFLECTED FROM THE THREE DIMENSIONAL ENVIRONMENT ILLUMINATED BY EACH PULSE OF ILLUMINATION LIGHT

1205 GENERATE AN OUTPUT SIGNAL INDICATIVE OF THE DETECTED AMOUNT OF RETURN LIGHT ASSOCIATED WITH EACH PULSE OF ILLUMINATION LIGHT

1206 DETERMINE A DISTANCE BETWEEN THE PLURALITY OF PULSED ILLUMINATION SOURCES AND AN OBJECT IN THE THREE DIMENSIONAL ENVIRONMENT BASED ON A DIFFERENCE BETWEEN A TIME WHEN EACH PULSE IS EMITTED FROM THE LIDAR DEVICE AND A TIME WHEN EACH PHOTOSENSITIVE DETECTOR DETECTS AN AMOUNT OF LIGHT REFLECTED FROM THE OBJECT ILLUMINATED BY THE PULSE OF ILLUMINATION LIGHT

FIG. 12

LIDAR SYSTEM HAVING A LINEAR FOCAL PLANE, AND RELATED METHODS AND APPARATUS

TECHNICAL FIELD

The present disclosure relates to light detection and ranging (LIDAR) based three-dimensional (3-D) point cloud measuring systems.

BACKGROUND

LIDAR systems generally use beams of light to measure distance ("range") to an object. Each light beam may include one or more pulses of light. A beam of light emitted from a light source of a LIDAR system interacts with a distal object. A portion of the light reflects from the object and returns to a detector of the LIDAR system. In some cases, the range to the object is estimated based on the time elapsed between emission of the beam of light and detection of the returned beam of light. The time it takes for a beam of laser light to travel to an object and return to a detector mounted near the emitter can be measured. The distance to the object can be derived from the time measurement with high accuracy. In other cases, the range to the object may be determined based on the wavelength (or frequency) of the return beam(s) of light reflected by the object. In some examples, the beams of light are generated by a laser emitter. The light beams may be focused through a lens or lens assembly.

Some LIDAR systems use a single laser emitter/detector combination combined with a rotating mirror to effectively scan across a plane. Distance measurements performed by such a system are effectively two-dimensional (2-D) (i.e., planar), and the captured distance points can be rendered as a 2-D (i.e. single plane) point cloud. In some examples, rotating mirrors are rotated at very fast speeds (e.g., thousands of revolutions per minute).

In many operational scenarios, a 3-D point cloud is preferred. A number of schemes have been used to interrogate the surrounding environment in three dimensions. In some examples, a 2-D instrument is actuated up and down and/or back and forth, often on a gimbal. This is commonly known within the art as "winking" or "nodding" the sensor. Thus, a single beam LIDAR unit can be used to capture an entire 3-D array of distance points, albeit one point at a time. In a related example, a prism is used to "divide" the laser beam into multiple layers, each having a slightly different vertical angle. This simulates the nodding effect described above, but without mechanical actuation of the sensor itself.

In all the above examples, the light path of a single laser emitter/detector combination is altered to achieve a broader field of view than a single sensor. The number of pixels such devices can generate per unit time is generally limited due to limitations on the pulse repetition rate of a single laser. Any alteration of the beam path, whether it is by mirror, prism, or mechanical actuation of the device that achieves a larger coverage area generally comes at a cost of decreased point cloud density.

As noted above, 3-D point cloud systems exist in several configurations. However, in many applications it is preferable to scan over a broad field of view. For example, in an autonomous vehicle application, it is generally preferable for the vertical field of view to extend down as close as possible to see the ground in front of the vehicle. In addition, it is generally preferable for the vertical field of view to extend above the horizon, in the event the car enters a dip in the road. In addition, it is generally preferable to minimize the delay between the actions happening in the real world and the imaging of those actions. In some examples, it is desirable to provide a complete image update at least five times per second. To address these requirements, a 3-D LIDAR system has been developed that includes an array of multiple laser emitters and detectors. This system is described in U.S. Pat. No. 7,969,558 issued on Jun. 28, 2011, the subject matter of which is incorporated by reference herein in its entirety.

In many applications, a sequence of beams is emitted. The direction of each beam is sequentially varied in rapid succession. In these examples, a distance measurement associated with each individual beam can be considered a pixel, and a collection of pixels captured in rapid succession (e.g., "point cloud") can be rendered as an image or analyzed for other reasons (e.g., detecting obstacles). In some examples, viewing software is used to render the resulting point clouds as images that appear 3-D to a user. Different schemes can be used to depict the distance measurements as 3-D images that appear as if they were captured by a live action camera.

Improvements in the opto-mechanical design of LIDAR systems are desired, while maintaining high levels of imaging resolution and range.

The foregoing examples of the related art and limitations therewith are intended to be illustrative and not exclusive, and are not admitted to be "prior art." Other limitations of the related art will become apparent to those of skill in the art upon a reading of the specification and a study of the drawings.

SUMMARY

LIDAR sensors having linear focal planes, and methods of manufacturing and operating such LIDAR sensors, are described herein.

At least one aspect of the present disclosure is directed to a light detection and ranging (LIDAR) device. The LIDAR device includes a plurality of laser sources configured to provide a plurality of transmit beams, each laser source of the plurality of laser sources being positioned with a respective offset of a first plurality of offsets relative to a reference line, a plurality of transmit/receive (T/R) interfaces configured to pass the plurality of transmit beams and reflect received light towards a plurality of detectors, each T/R interface of the plurality of T/R interfaces being positioned with a respective offset of a second plurality of offsets relative to the reference line, and a plurality of lenses positioned between the plurality of laser sources and the plurality of T/R interfaces, each lens of the plurality of lenses being positioned with a respective offset of a third plurality of offsets relative to the reference line, wherein the plurality of laser sources and the plurality of lenses, as positioned, are configured to provide beam-steering of the plurality of transmit beams.

Another aspect of the present disclosure is directed to a method for operating a light detection and ranging (LIDAR) device. The method includes providing a plurality of transmit beams via a plurality of laser sources, each laser source of the plurality of laser sources being positioned with a respective offset of a first plurality of offsets relative to a reference line, conditioning the plurality of transmit beams via a plurality of lenses, each lens of the plurality of lenses being positioned with a respective offset of a second plurality of offsets relative to the reference line, and passing the plurality of transmit beams and reflecting received light towards a plurality of detectors via a plurality of transmit/ receive (T/R) interfaces, each T/R interface of the plurality of T/R interfaces being positioned with a respective offset of a third plurality of offsets relative to the reference line, wherein the plurality of laser sources and the plurality of lenses, as positioned, provide beam-steering of the plurality of transmit beams.

Another aspect of the present disclosure is directed to a method for manufacturing a light detection and ranging (LIDAR) device. The method includes providing a laser source array including a plurality of laser sources disposed with a first pitch on a first substrate, the plurality of laser sources configured to provide a respective plurality of transmit beams, wherein providing the laser source array comprises positioning at least one laser source of the plurality of laser sources with a first offset relative to a reference line, providing a lens array including a plurality of lenses disposed with a second pitch on a second substrate, the plurality of lenses configured to condition the respective plurality of transmit beams provided by the laser source array, wherein providing the lens array comprises positioning at least one lens of the plurality of lenses with a second offset relative to the reference line, and providing a transmit/receive (T/R) interface array including a plurality of T/R interfaces disposed with a third pitch on a third substrate, the plurality of T/R interfaces configured to pass the respective plurality of transmit beams conditioned by the lens array and to reflect received light towards a plurality of detectors, wherein providing the T/R interface array comprises positioning at least one T/R interface of the plurality of T/R interfaces with a third offset relative to the reference line, wherein the laser source array and the lens array, as positioned, are configured to provide beam steering of one or more of the plurality of transmit beams.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of any of the present inventions. As can be appreciated from foregoing and following description, each and every feature described herein, and each and every combination of two or more such features, is included within the scope of the present disclosure provided that the features included in such a combination are not mutually inconsistent. In addition, any feature or combination of features may be specifically excluded from any embodiment of any of the present inventions.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the generally description given above and the detailed description of the preferred embodiments given below serve to explain and teach the principles described herein.

FIG. 5 is a schematic diagram of a single channel LIDAR system, according to an example.

FIG. 12 is a method for operating a LIDAR system in accordance with some embodiments.

Figure 1:
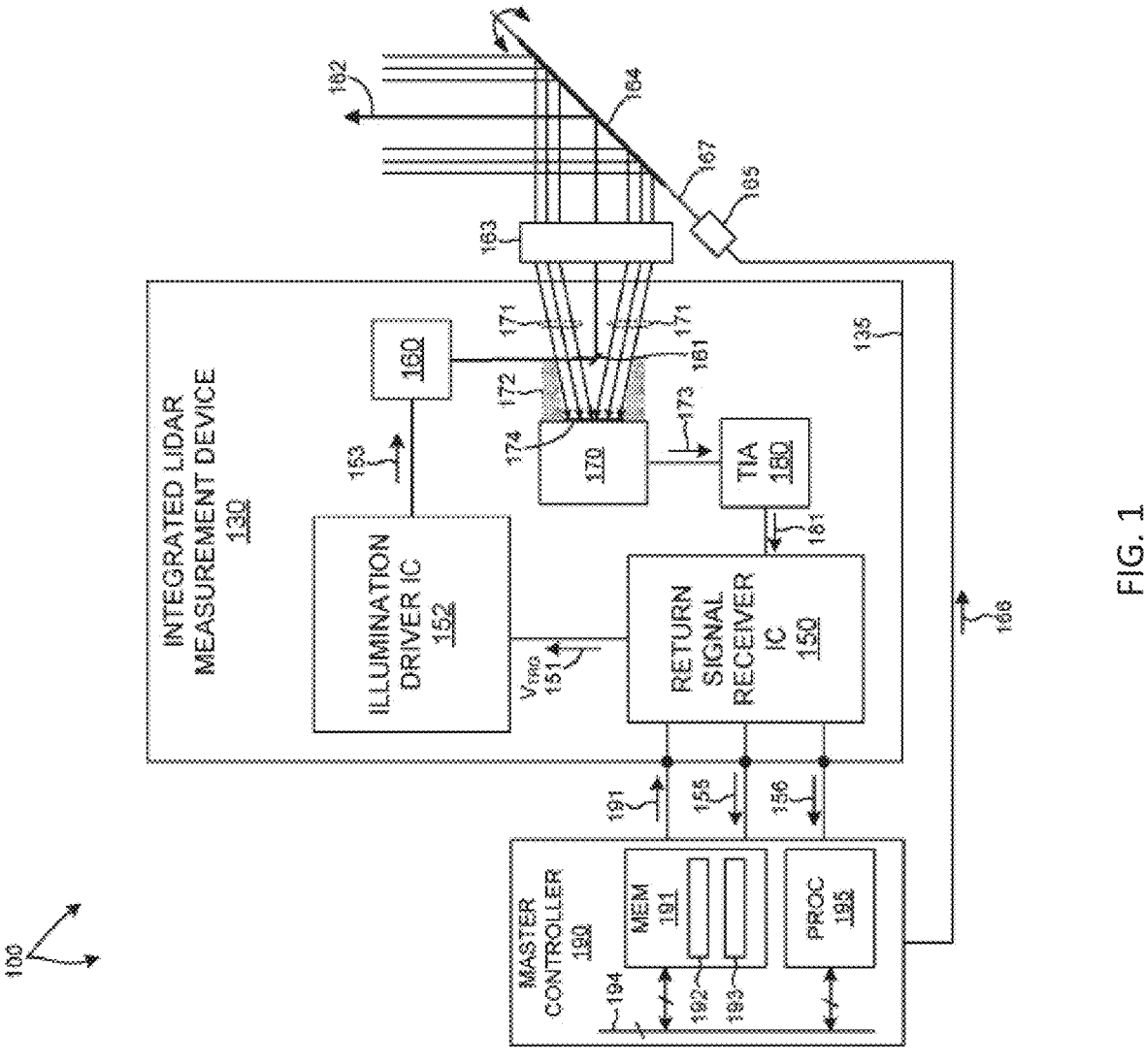
FIG. 1 is a functional block diagram of an example 3-D LIDAR system.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

Systems and methods relating to LIDAR devices having linear focal planes are described herein. In at least one embodiment, at least one component included in a LIDAR device is positioned such that the LIDAR device provides micro-optic beam steering. For example, micro-optic beam steering is provided if a lens (e.g., microlens) of a LIDAR channel changes the direction of the chief ray of a laser beam passing through the lens by more than a threshold amount.

For example, the laser and/or the lens (e.g., microlens) of a LIDAR channel may be positioned (e.g., relative to each other) to provide micro-optic beam steering. In some examples, the micro-optic beam steering allows the LIDAR device to be included in a device array having a linear (or flat) focal plane arrangement. As such, the size of the LIDAR device array (and the LIDAR system) can be reduced. In certain examples, the time and cost per channel alignment of the LIDAR device array can be reduced by using multi-channel array components that are aligned at the component level.

Reference will now be made in detail to background examples and some embodiments of the invention, examples of which are illustrated in the accompanying drawings. It will be appreciated that, for simplicity and clarity of illustration, where considered appropriate, reference numerals may be repeated among the figures to indicate corresponding or analogous elements. In addition, numerous specific details are set forth to provide a thorough understanding of the exemplary embodiments described herein. However, it will be understood by those of ordinary skill in the art that the exemplary embodiments described herein may be practiced without these specific details.

Some Examples of LIDAR Systems

FIG. 1 depicts a LIDAR measurement system 100 in one embodiment. LIDAR measurement system 100 includes a master controller 190, one or more LIDAR measurement devices 130, one or more beam shaping optical assemblies 163, and one or more beam scanning devices 164. A LIDAR measurement device 130 includes a return signal receiver integrated circuit (IC), an illumination driver integrated circuit (IC) 152, an illumination source 160, a photodetector 170, and a trans-impedance amplifier (TIA) 180. In some embodiments, each of these components is mounted to a common substrate 135 (e.g., printed circuit board) that provides mechanical support and electrical connectivity among the components. In such embodiments, the LIDAR measurement device 130 may be referred to herein as an "integrated LIDAR measurement device."

Illumination source 160 emits a measurement beam of illumination light 162 in response to an electrical signal (e.g., electrical current) 153. The beam of illumination light 162 may include one or more pulses. In some embodiments, the illumination source 160 is laser based (e.g., a laser diode). In some embodiments, the illumination source is based on one or more light emitting diodes. In general, any suitable illumination source (e.g., pulsed illumination source) may be used. Illumination light 162 exits LIDAR measurement device 100 and reflects from an object in the surrounding 3-D environment under measurement. A portion of the reflected light is collected as return measurement light 171 associated with the illumination light 162. As depicted in FIG. 1, illumination light 162 emitted from integrated LIDAR measurement device 130 and corresponding return measurement light 171 directed toward integrated LIDAR measurement device 130 share a common optical path.

In one aspect, the illumination light 162 is focused and projected toward a particular location in the surrounding environment by one or more beam shaping optical components (collectively, "beam shaping optical assembly") 163 and a beam scanning device 164 of LIDAR measurement system 100. In a further aspect, the return measurement light 171 is directed and focused onto photodetector 170 by beam scanning device 164 and the one or more beam shaping optical components 163 of LIDAR measurement system 100. The beam scanning device is used in the optical path between the beam shaping optics and the environment under measurement. The beam scanning device effectively expands the field of view and/or increases the sampling density within the field of view of the 3-D LIDAR system.

In the embodiment depicted in FIG. 1, beam scanning device 164 includes a moveable mirror component that is rotated about an axis of rotation 167 by rotary actuator 165. Command signals 166 generated by master controller 190 are communicated from master controller 190 to rotary actuator 165. In response, rotary actuator 165 scans moveable mirror component 164 in accordance with a desired motion profile. Other beam scanning techniques maybe used. In some embodiments, in addition to rotating about an axis of rotation 167 (or as an alternative to such rotation), the movable mirror may be oscillate on one or more axes to scan in one or more dimensions (e.g., horizontally or vertically). The oscillation may provide the LiDAR system with 5-180 degrees (e.g., 5-120 degrees, 15-120 degrees, 70 degrees, 90 degrees, or 120 degrees) of view in the direction scanned via the mirror's oscillation. Any suitable technique may be used to control the mirror's oscillation including, without limitation, the techniques described in U.S. patent application Ser. No. 17/392,080, titled "Scanning Mirror Mechanisms for LIDAR Systems, and Related Methods and Apparatus" and filed on Aug. 2, 2021, which is hereby incorporated by reference herein in its entirety.

Integrated LIDAR measurement device 130 includes a photodetector 170 having an active sensor area 174. As depicted in FIG. 1, illumination source 160 is located outside the field of view of the active area 174 of the photodetector. As depicted in FIG. 1, an overmold lens 172 is mounted over the photodetector 170. The overmold lens 172 includes a conical cavity that corresponds with the ray acceptance cone of return light 171. Illumination light 162 from illumination source 160 is injected into the detector reception cone by a fiber waveguide. An optical coupler optically couples illumination source 160 with the fiber waveguide. At the end of the fiber waveguide, a mirror component 161 is oriented at a 45 degree angle with respect to the waveguide to inject the illumination light 162 into the cone of return light 171. In one embodiment, the end faces of fiber waveguide are cut at a 45 degree angle and the end faces are coated with a highly reflective dielectric coating to provide a mirror surface. In some embodiments, the waveguide includes a rectangular shaped glass core and a polymer cladding of lower index of refraction. In some embodiments, the entire optical assembly is encapsulated with a material having an index of refraction that closely matches the index of refraction of the polymer cladding. In this manner, the waveguide injects the illumination light 162 into the acceptance cone of return light 171 with minimal occlusion.

The placement of the waveguide within the acceptance cone of the return light 171 projected onto the active sensing area 174 of detector 170 may be selected to facilitate maximum overlap of the illumination spot and the detector field of view in the far field.

As depicted in FIG. 1, return light 171 reflected from the surrounding environment is detected by photodetector 170. In some embodiments, photodetector 170 is an avalanche photodiode. Photodetector 170 generates an output signal 173 that is amplified by an amplifier 180 (e.g., an analog trans-impedance amplifier (TIA)). In general, the amplifier 180 may include one or more amplifier stages of any suitable type. In this sense, an analog trans-impedance amplifier is provided by way of non-limiting example, as many other analog signal amplification schemes may be contemplated within the scope of this disclosure. Although TIA 180 is depicted in FIG. 1 as a discrete device separate from the receiver IC 150, in general, TIA 180 may be integrated with receiver IC 150. In some embodiments, it is preferable to integrate TIA 180 with receiver IC 150 to save space and reduce signal contamination.

The amplified signal 181 is communicated to return signal receiver IC 150. Receiver IC 150 includes timing circuitry and a time-to-digital converter that estimates the time of flight of the measurement beam from illumination source 160, to a reflective object in the 3-D environment, and back to the photodetector 170. A signal 155 indicative of the estimated time of flight is communicated to master controller 190 for further processing and/or communication to a user of the LIDAR measurement system 100. In addition, return signal receiver IC 150 may be configured to digitize segments of the return signal 181 that include peak values (e.g., return pulses), and communicate signals 156 indicative of the digitized segments to master controller 190. In some embodiments, master controller 190 processes these signal segments to identify properties of the detected object. In some embodiments, master controller 190 communicates signals 156 to a user of the LIDAR measurement system 100 for further processing.

Master controller 190 is configured to generate a measurement command signal 191 (e.g., pulse command signal) that is communicated to receiver IC 150 of integrated LIDAR measurement device 130. Measurement command signal 191 is a digital signal generated by master controller 190. Thus, the timing of measurement command signal 191 is determined by a clock associated with master controller 190. In some embodiments, the measurement command signal 191 is directly used to trigger generation of illumination light 162 by illumination driver IC 152 and data acquisition by receiver IC 150. However, in some embodiments, illumination driver IC 152 and receiver IC 150 do not share the same clock as master controller 190. For this reason, precise estimation of time of flight becomes much more computationally tedious when the measurement command signal 191 is directly used to trigger illumination light generation (e.g., "transmission" or "transmitting" by LIDAR measurement device 130) and data acquisition ("reception" or "receiving" by LIDAR measurement device 130).

In general, a LIDAR measurement system includes a number of different LIDAR measurement devices 130 (e.g., integrated LIDAR measurement devices) each emitting a beam (e.g., pulsed beam) of illumination light from the LIDAR device into the surrounding environment and measuring return light reflected from objects in the surrounding environment.

In these embodiments, master controller 190 communicates a measurement command signal 191 to each different LIDAR measurement device. In this manner, master controller 190 coordinates the timing of LIDAR measurements performed by any number of LIDAR measurement devices. In a further aspect, beam shaping optical components 163 and beam scanning device 164 are in the optical path of the illumination light (e.g., pulses) and return measurement light (e.g., pulses) associated with each of the integrated LIDAR measurement devices. In this manner, beam scanning device 164 directs each illumination light signal and return measurement light signal of LIDAR measurement system 100.

In the depicted embodiment, receiver IC 150 receives measurement command signal 191 and generates a measurement trigger signal $V_{TRG}$ 151 (e.g., pulse trigger signal) in response to the measurement command signal 191. Measurement trigger signal 151 is communicated to illumination driver IC 152 and directly triggers illumination driver IC 152 to electrically couple illumination source 160 to a power supply, thereby generating illumination light 162. In addition, measurement trigger signal 151 directly triggers data acquisition of return signal 181 and associated time of flight calculation. In this manner, measurement trigger signal 151 generated based on the internal clock of receiver IC 150 is used to trigger both illumination light generation and return light data acquisition. This process facilitates precise synchronization of illumination light generation and return light data acquisition, which enables precise time of flight calculations by time-to-distance conversion.

Figure 2:
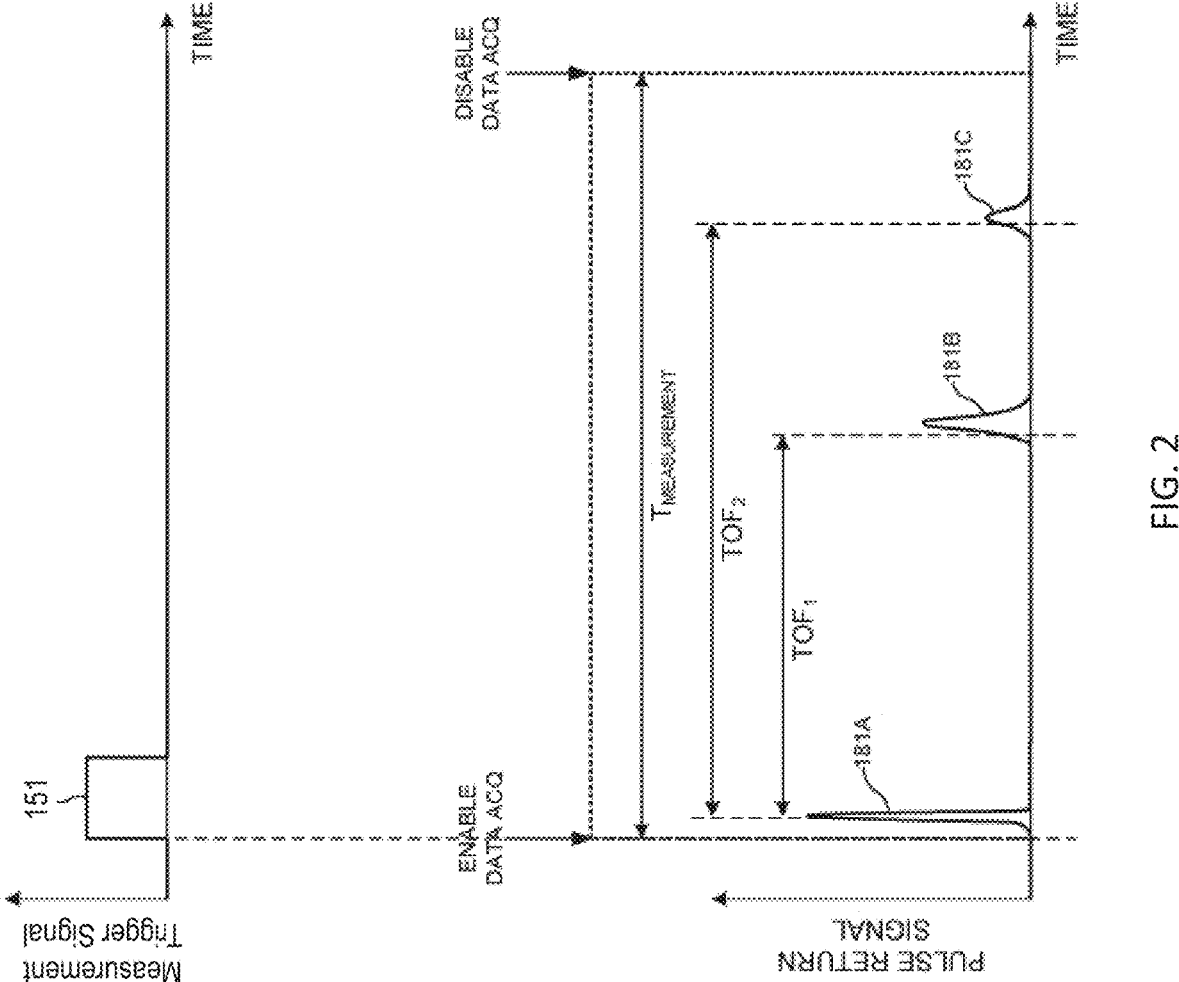
FIG. 2 depicts an illustration of the timing of emission of a pulsed measurement beam and capture of the returning measurement pulse, according to an example.

FIG. 2 depicts an illustration of the timing associated with the emission of measurement light from LIDAR measurement device 130 and capture of the returning measurement light. For ease of illustration, in the example of FIG. 2, the illumination light 162 includes a single illumination pulse. As depicted in FIG. 2, a measurement is initiated by the rising edge of measurement trigger signal 151 generated by receiver IC 150. As depicted in FIGS. 1 and 2, an amplified return signal 181 is received by receiver IC 150. As described herein, a measurement window (e.g., a period of time over which collected return signal data is associated with a particular illumination beam) is initiated by enabling data acquisition at the rising edge of measurement trigger signal 151. Receiver IC 150 controls the duration of the measurement window, $T_{measurement}$, to correspond with the window of time when return measurement light is expected in response to the emission of illumination light (e.g., a measurement pulse sequence). In some examples, the measurement window is enabled at the rising edge of measurement trigger signal 151 and is disabled at a time corresponding to the time of flight of light over a distance that is approximately twice the range of the LIDAR system. In this manner, the measurement window is open to collect return measurement light from objects adjacent to the LIDAR system (e.g., negligible time of flight) to objects that are located at the maximum nominal range of the LIDAR system. In this manner, other light that cannot possibly contribute to useful return measurement signal is rejected.

As depicted in FIG. 2, return signal 181 includes three return measurement pulses that correspond with the emitted illumination light. In general, signal detection is performed on all detected measurement pulses. Further signal analysis may be performed to identify the closest valid signal 181B (i.e., first valid instance of a return measurement pulse), the strongest signal, and the furthest valid signal 181C (i.e., last valid instance of a return measurement pulse in the measurement window). Any of these return measurement pulses may be correspond to and be reported as potentially valid distance measurements by the LIDAR system.

Internal system delays associated with emission of light from the LIDAR system (e.g., signal communication delays and latency associated with the switching components, energy storage components, and pulsed light emitting device) and delays associated with collecting light and generating signals indicative of the collected light (e.g., amplifier latency, analog-digital conversion delay, etc.) can contribute to errors in the estimation of the time of flight of a measurement pulse of light. Thus, measurement of time of flight based on the elapsed time between the rising edge of the measurement trigger signal 151 and each valid return pulse (e.g., 181B and 181C) can introduce undesirable measurement error. In some embodiments, a calibrated, pre-determined delay time is used to compensate for the electronic delays to arrive at a corrected estimate of the actual optical time of flight. However, the accuracy of a static correction to dynamically changing electronic delays is limited. Although frequent re-calibrations may be used to account for such changes, this re-calibration comes at a cost of computational complexity and may interfere with system up-time.

In another aspect, receiver IC 150 may measure time of flight based on the time elapsed between the detection of a detected pulse 181A due to internal cross-talk between the illumination source 160 and photodetector 170 and a valid return pulse (e.g., 181B or 181C). In this manner, systematic delays can be eliminated from the estimation of time of flight. Pulse 181A is generated by internal cross-talk with effectively no distance of light propagation. Thus, the delay in time from the rising edge of the measurement trigger signal to the detection of pulse 181A captures all of the systematic delays associated with illumination and signal detection. By measuring the time of flight of valid return pulses (e.g., return pulses 181B and 181C) with reference to detected pulse 181A, all of the systematic delays associated with illumination and signal detection due to internal cross-talk are eliminated. As depicted in FIG. 2, receiver IC 150 estimates the time of flight, $TOF_1$, associated with return pulse 181B and the time of flight, $TOF_2$, associated with return pulse 181C with reference to return pulse 181A.

In some embodiments, the signal analysis is performed by receiver IC 150, entirely. In these embodiments, signals 155 communicated from integrated LIDAR measurement device 130 include an indication of the time of flight determined by receiver IC 150. In some embodiments, signals 156 include digitized segments of return signal 181 generated by receiver IC 150. These raw measurement signal segments are processed further by one or more processors located on board the 3-D LIDAR system, or external to the 3-D LIDAR system to arrive at another estimate of distance, an estimate of one of more physical properties of the detected object, or a combination thereof.

Figure 3A:
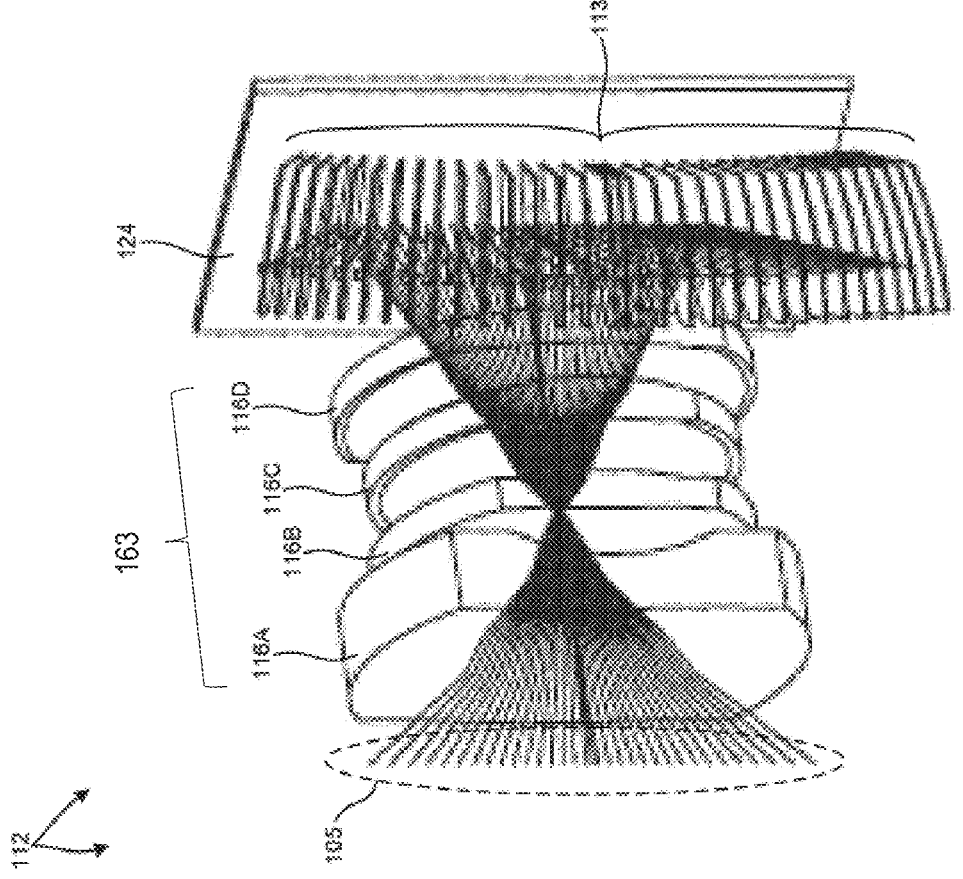
FIG. 3A depicts a view of a light emission/collection engine of 3-D LIDAR system, according to an example.

FIG. 3A depicts a light emission/collection engine 112 in one embodiment. Light emission/collection engine 112 includes an array 113 of LIDAR measurement devices (e.g., integrated LIDAR measurement devices) 130. In some embodiments, each LIDAR measurement device 130 includes a light emitting component, a light detecting component, and associated control and signal conditioning electronics integrated onto a common substrate (e.g., electrical board).

Light emitted from each integrated LIDAR measurement device passes through beam shaping optical assembly 163, which includes beam shaping optical components 116 that collimate the emitted light to generate a beam of illumination light 162 projected from the 3-D LIDAR system into the environment. In this manner, an array of beams of light 105, each emitted from a different LIDAR measurement device, are emitted from 3-D LIDAR system 100 as depicted in FIG. 3A. In general, any number of LIDAR measurement devices can be arranged to simultaneously emit any number of light beams from 3-D LIDAR system 100. Light reflected from an object in the environment due to its illumination by a particular LIDAR measurement device is collected by beam shaping optical components 116. The collected light passes through beam shaping optical components 116 where it is focused onto the detecting component of the same, particular LIDAR measurement device. In this manner, collected light associated with the illumination of different portions of the environment by illumination light generated by different LIDAR measurement devices is separately focused onto the detector of each corresponding LIDAR measurement device.

Figure 3B:
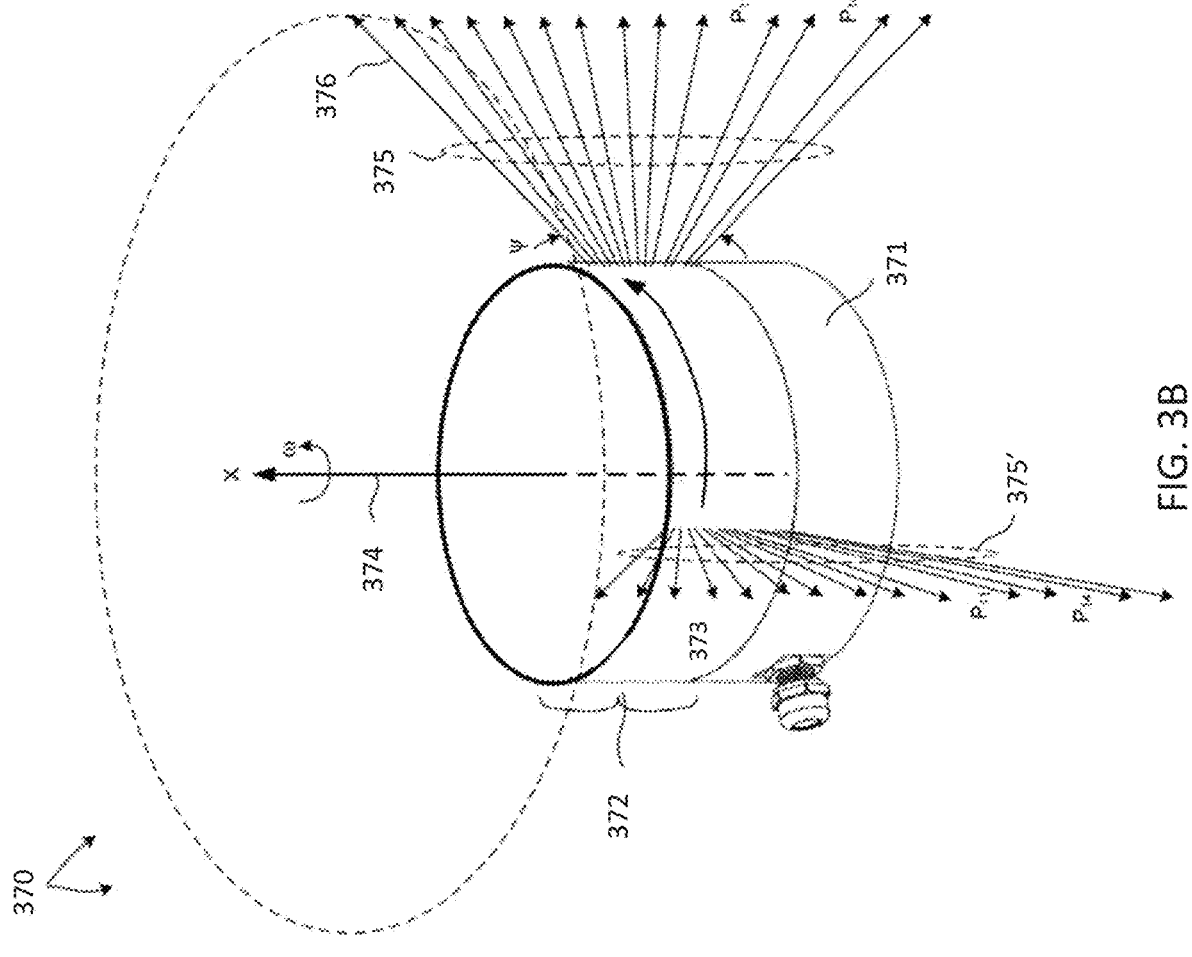
FIG. 3B is an illustration of an example of a three-dimensional ("3D") LIDAR system.

FIG. 3B depicts a 3D LIDAR system 370, according to some embodiments. In the example of FIG. 3B, the 3D LIDAR system 370 includes a lower housing 371 and an upper housing 372. The upper housing 372 includes a cylindrical shell component 373 constructed from a material that is transparent to infrared light (e.g., light having a wavelength within the spectral range of 700 to 1,700 nanometers). In one example, the cylindrical shell component 373 is transparent to light having wavelengths centered at 905 nanometers.

In some embodiments, the 3D LIDAR system 370 includes a LIDAR transceiver (e.g., LIDAR measurement device 130) operable to emit laser beams 376 through the cylindrical shell component 373 of the upper housing 372. In the example of FIG. 3B, each individual arrow in the sets of arrows 375, 375' directed outward from the 3D LIDAR system 370 represents a laser beam 376 (e.g., illumination light 162) emitted by the 3D LIDAR system. Each beam of light emitted from the system 370 may diverge slightly, such that each beam of emitted light forms a cone of illumination light emitted from system 370. In one example, a beam of light emitted from the system 370 illuminates a spot size of 20 centimeters in diameter at a distance of 100 meters from the system 370.

In some embodiments, the transceiver (e.g., LIDAR measurement device 130) emits each laser beam 376 transmitted by the 3D LIDAR system 370. The direction of each emitted beam may be determined by the angular orientation ω of the transceiver's transmitter (e.g., illumination source 160 and mirror component 161) with respect to the system's central axis 374 and by the angular orientation ψ of the transmitter's movable mirror with respect to the mirror's axis of oscillation (or rotation). For example, the direction of an emitted beam in a horizontal dimension may be determined the transmitter's angular orientation ω, and the direction of the emitted beam in a vertical dimension may be determined by the angular orientation ψ of the transmitter's movable mirror. In one example, the angular orientation ω of the transceiver's transmitter corresponds to the angular orientation of the illumination light 162 provided by the illumination source 160 as reflected off the mirror component 161. In some examples, the transmitter's moveable mirror corresponds to a mirror included within the transmitter (or the transceiver); however, in other examples, the moveable mirror may correspond to a mirror that is external to the transmitter (or the transceiver). For example, the angular orientation ψ of the transmitter's movable mirror may correspond to the angular orientation of the mirror 164.

Alternatively, the direction of an emitted beam in a vertical dimension may be determined by the transmitter's angular orientation ω, and the direction of the emitted beam in a horizontal dimension may be determined by the angular orientation ψ of the transmitter's movable mirror. (For purposes of illustration, the beams of light 375 are illustrated in one angular orientation relative to a non-rotating coordinate frame of the 3D LIDAR system 370 and the beams of light 375' are illustrated in another angular orientation relative to the non-rotating coordinate frame.)

The 3D LIDAR system 370 may scan a particular point in its field of view by adjusting the orientation ω of the transmitter and the orientation ψ of the transmitter's movable mirror to the desired scan point (ω, ψ) and emitting a laser beam from the transmitter. Likewise, the 3D LIDAR system 370 may systematically scan its field of view by adjusting the orientation ω of the transmitter and the orientation ψ of the transmitter's movable mirror to a set of scan points (ωi, ψj) and emitting a laser beam from the transmitter at each of the scan points.

Assuming that the optical component(s) (e.g., mirror 164) of a LIDAR transceiver remain stationary during the time period after the transmitter emits a laser beam (e.g., a pulsed laser beam or "pulse") and before the receiver (e.g., photodetector 170) receives the corresponding return beam, the return beam generally forms a spot centered at (or near) a stationary location L0 on the detector. This time period is referred to herein as the "ranging period" of the scan point associated with the transmitted beam and the return beam. In some embodiments, the ranging period and the "measurement window" (described below) may be approximately the same.

Figure 4:
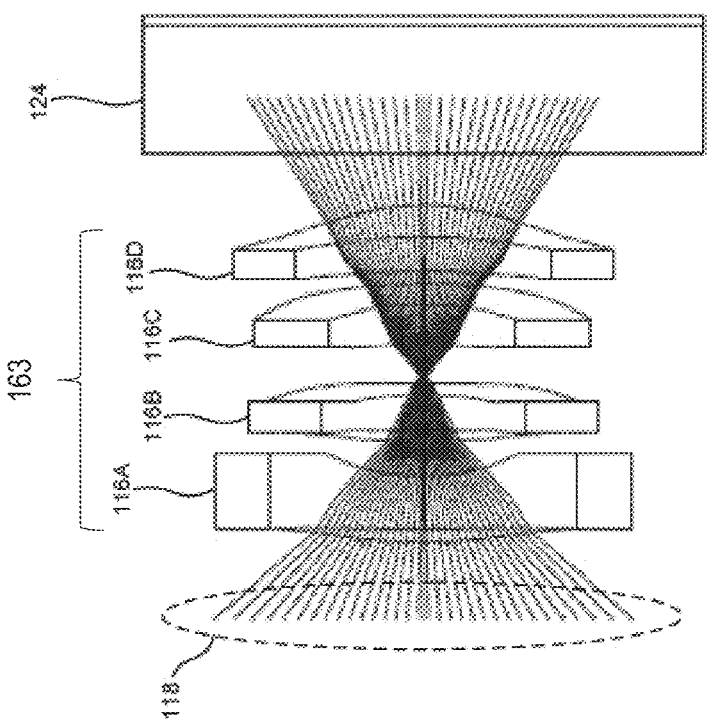
FIG. 4 depicts a view of collection optics of a 3-D LIDAR system, according to an example.

FIG. 4 depicts a view of beam shaping optical components 116 in greater detail. As depicted in FIG. 4, beam shaping optical components 116 include four lens components 116A-D arranged to focus collected light 118 onto each detector of the array 113 of LIDAR measurement devices 130. In the embodiment depicted in FIG. 4, light passing through optical assembly 163 is reflected from mirror 124 (e.g., mirror 164) and is directed onto each detector of the array 113 of LIDAR measurement devices 130. In some embodiments, one or more of the beam shaping optical components 116 is constructed from one or more materials that absorb light outside of a predetermined wavelength range. The predetermined wavelength range may include the wavelengths of light emitted by the array 113 of LIDAR measurement devices 130. In one example, one or more of the lens components are constructed from a plastic material that includes a colorant additive to absorb light having wavelengths less than infrared light generated by each of the array 113 of LIDAR measurement devices 130. In one example, the colorant is Epolight 7276A available from Aako BV (The Netherlands). In general, any number of different colorants can be added to any of the plastic lens components of optical components 116 to filter out undesired spectra.

Some Examples of LIDAR Systems with Curved Focal Planes

FIG. 5 is a schematic diagram of a single channel LIDAR system 500. In one example, the LIDAR system 500 includes a LIDAR arrangement 502 that corresponds to a portion of the LIDAR measurement device 130 of FIG. 1. For example, the LIDAR arrangement 502 includes a laser source 504 (e.g., illumination source 160), a lens 506, and a transmit/receive (T/R) interface 508. In one example, the T/R interface 508 includes a mirror 508a. In some examples, the T/R interface 508 includes the mirror 508a and a detector 508b (e.g., the photodetector 170), which may be referred to collectively as a mirror-detector sub-assembly. In other examples, the detector 508b can be included as a separate component (or device). Alternatively, the mirror 508a may be interchanged with a beam splitter component (or device). In some examples, the LIDAR arrangement 502 may correspond to the LIDAR measurement devices of FIGS. 3 and 4.

The laser source 504 is configured to provide a transmit beam (i.e., light) 520 (e.g., illumination light 162) to the lens 506. The lens 506 includes one or more micro-optic lenses configured to provide beam shaping functionality for the laser source 504. The mirror 508a passes the transmit beam 520, and reflects received light 522 (e.g., return measurement light 171) towards the detector 508b. In one example, the mirror 508a may be configured as a pinhole mirror to pass the transmit beam 520 and reflect the received light 522; however, in other examples, the mirror 508a may include a material and/or coating that provides the selective reflection of light. In some examples, the detector 508b is an avalanche photodiode (APD).

Being that the transmit beam 520 represents a single channel, the LIDAR arrangement 502 may direct the transmit beam 520 to a system-level lens 550 (e.g., beam shaping optical assembly 163) before the transmit beam 520 is projected into the environment along with transmit beams from other channels. Likewise, the received light 522 may be directed to the LIDAR arrangement 502 via the lens 550.

Figure 6A:
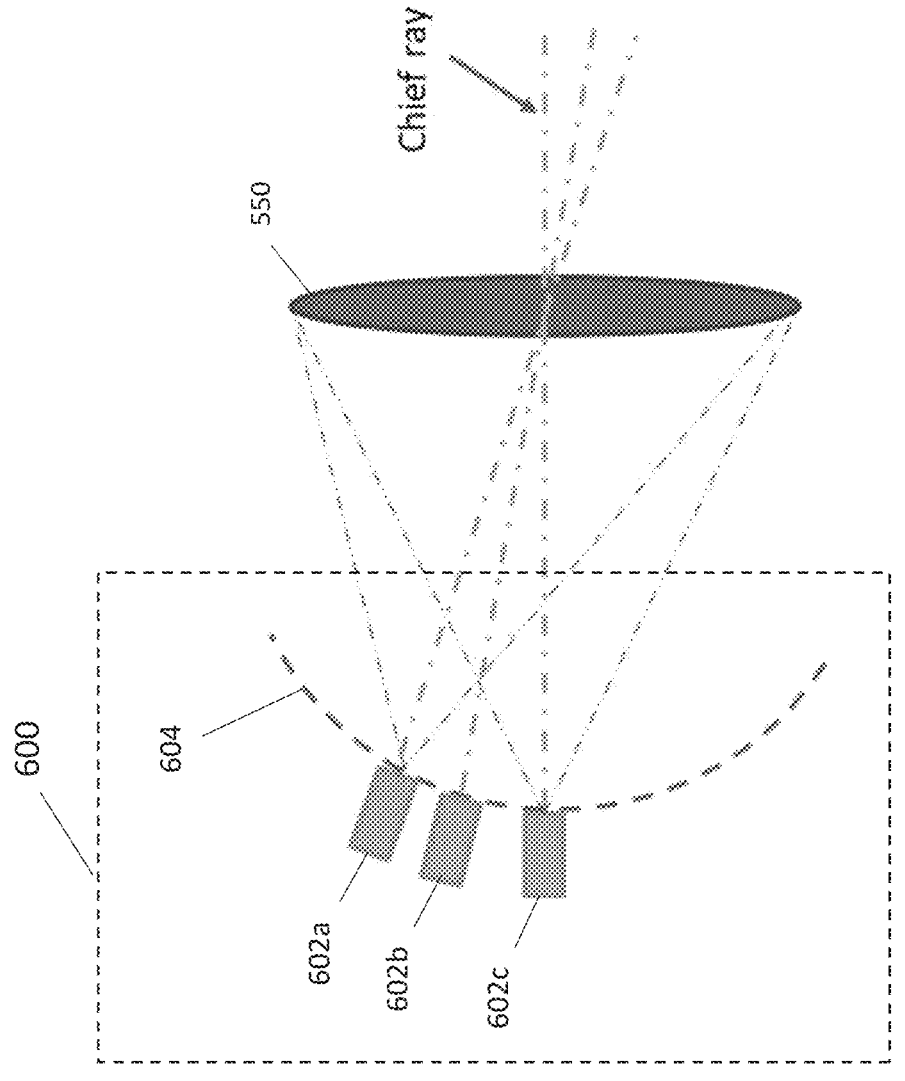
FIGS. 6A-6B are schematic diagrams of a LIDAR device array, according to an example.

As described above, multiple LIDAR devices can be arranged to provide an array of LIDAR devices (e.g., the array 113 of FIG. 3A). FIG. 6A depicts an example LIDAR device array 600. The LIDAR device array 600 includes a plurality of LIDAR devices 602 including a first device 602a, a second device 602b, and a third device 602c. In one example, each of the LIDAR devices 602 includes components corresponding to the LIDAR arrangement 502 of FIG. 5; however, in other examples, each of the LIDAR devices 602 may include components corresponding to two or more instances of the LIDAR arrangement 502 (i.e., multiple channels in array form).

The LIDAR devices 602 are positioned along a curved focal plane 604. In one example, the LIDAR devices 602 are positioned along the curved focal plane 604 such that each channel is pointing towards the center of the lens 550 (e.g., each channel's light source is oriented such that the chief rays of the beams it emits pass through the center of the lens 550). By physically pointing each channel towards the center of the lens 550, the LIDAR array 600 can achieve overall better system performance (e.g., reduce light clipping at the lens 550). However, due to the unique positioning of each LIDAR device 602, manufacturing the LIDAR device array 600 may involve individually aligning each LIDAR device 602 with respect to the system lens 550. Also, the process of aligning each device 602 individually can be expensive and time consuming. For example, the alignment process for each device may include iteratively tuning the laser source 504 on/off while adjusting the position of the lens 506 and/or the mirror 508a. In other examples, the alignment process may include precise time consuming lateral placement of each device 602 with respect to a reference point (e.g., fiducial) on a suitable mounting platform.

Figure 6B:
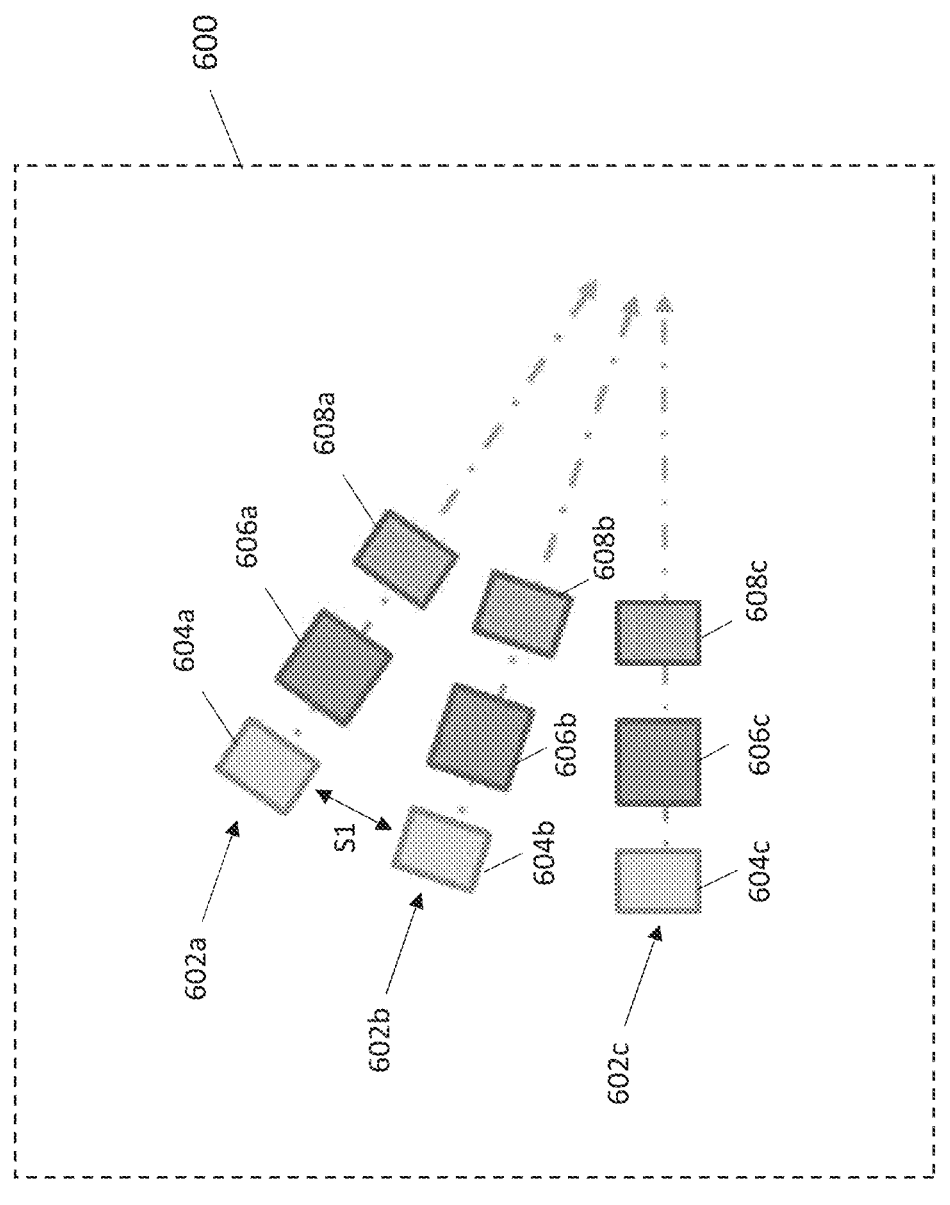

In addition, the unique positioning of each LIDAR device 602 around the curved focal plane 604 can increase the size of the LIDAR device array 600 (and the LIDAR system housing the array 600). For example, FIG. 6B depicts a component-level view of the LIDAR device array 600. As shown, each LIDAR device 602 includes a laser source 604, a lens 606, and a T/R interface 608. Due to the positioning of the LIDAR devices 602, a spacing (e.g., S1) exists between the components of each device. Such component-to-component spacing is undesirable as it increases the size and material cost of the LIDAR device array 600. In some examples, due to the orientations of the components, each LIDAR device 602 contains individual (i.e., discrete) components which can increase the cost of each channel.

Some Embodiments of LIDAR Systems with Linear (or Flat) Focal Planes

An improved LIDAR device and device array are provided herein. In at least one embodiment, at least one component (e.g., laser source, lens, etc.) included in the LIDAR device is positioned such that the LIDAR device provides micro-optic beam steering. For example, micro-optic beam steering is provided if a lens (e.g., microlens) of a LIDAR channel changes the direction of the chief ray of a laser beam passing through the lens by more than a threshold amount. For example, micro-optic beam steering may be provided if the direction of the chief ray of a laser beam exiting the lens deviates from the direction of the chief ray of the laser beam entering the lens by more than 0.1-0.5 degrees, 0.5-1.0 degrees, 1-2 degrees, 2-5 degrees, 5-10 degrees, 10-20 degrees, or more than 20 degrees. For example, the laser and/or the lens (e.g., microlens) of a LIDAR channel may be positioned (e.g., relative to each other) to provide micro-optic beam steering. In some examples, the micro-optic beam steering allows the LIDAR device to be included in a device array having a linear (or flat) focal plane arrangement. As such, the size of the LIDAR device array (and the LIDAR measurement system) can be reduced. In certain examples, the time and cost per channel alignment of the LIDAR device array can be greatly reduced by using multi-channel array components that are aligned at the component level.

Figure 7:
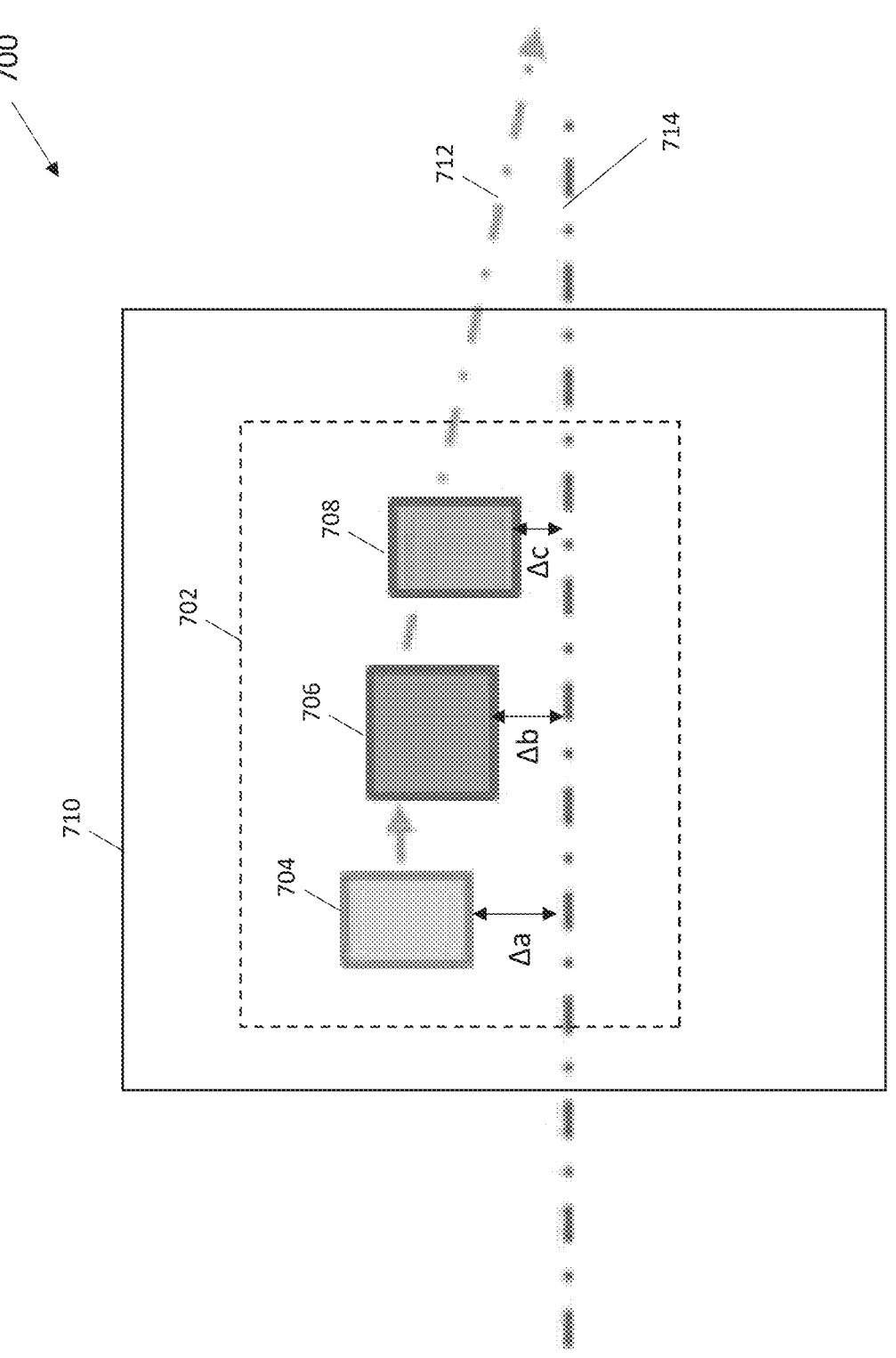
FIG. 7 is a schematic diagram of a LIDAR device assembly in accordance with some embodiments.

FIG. 7 depicts an example of a LIDAR device assembly 700 in accordance with some embodiments. In one example, the LIDAR device assembly 700 includes a LIDAR device 702 (e.g., an integrated LIDAR device). The LIDAR device 702 includes a laser source 704, a lens 706, and a T/R interface 708. In some examples, the laser source 704 corresponds to the laser source 504, the lens 706 corresponds to the lens 506, and the T/R interface 708 corresponds to the T/R interface 508 of the LIDAR arrangement 502 of FIG. 5.

In one example, the components of the LIDAR device 702 are configured to be disposed on a substrate 710 (e.g., common substrate 135). The substrate 710 may be a printed circuit board (PCB). The components may be disposed on a first surface or a second surface of the substrate 710. In the illustrated example, the components are disposed on the first (e.g., top) surface of the substrate 710. In some examples, the components of the LIDAR device 702 may be disposed on the substrate 710 within a common device package; however, in other examples, the substrate 710 may be an external component on which the LIDAR device 702 is disposed. The components of the LIDAR device 702 can be electrically and/or mechanically coupled to the substrate 710.

The position of each component of the LIDAR device 702 is offset relative to a reference line 714. In one example, the reference line 714 corresponds to the center (or boresight) line of a system lens (e.g., system lens 550). In other examples, the reference line 714 may correspond to the next adjacent channel (e.g., a predetermined channel boundary or the nearest component of the adjacent channel). In this context, "offset" corresponds to a distance between a component and the reference line 714. In one example, the laser source 704 is positioned with a first offset $\Delta a$, the lens 706 is positioned with a second offset $\Delta b$, and the T/R interface 708 is positioned with a third offset $\Delta c$. In some examples, the offsets $\Delta a$-$\Delta c$ can be scaled to provide micro-optic beam steering of a transmit beam 712 (e.g., the chief ray of the channel). For example, the LIDAR device 702 can be configured with a first offset $\Delta a$ that is larger than the second offset $\Delta b$ and the third offset $\Delta c$ to steer the transmit beam 712 in a first direction (e.g., a 'downward' direction in the illustration of FIG. 7). In one example, the first offset $\Delta a$ of the laser source 704 may be approximately 506 μm, the second offset $\Delta b$ of the lens 706 may be approximately 501.8 μm, and the third offset $\Delta c$ of the T/R interface 708 may be approximately 500 μm. Due to the relationship between the first offset $\Delta a$ and the second offset $\Delta b$, the transmit beam 712 is provided from the laser source 704 to an upper portion of the lens 706, causing the transmit beam 712 to be directed in the downward direction through the T/R interface 708. In some examples, the second offset $\Delta b$ of the lens 706 and the third offset $\Delta c$ of the T/R interface 708 may be approximately the same; however, in other examples, the offsets $\Delta b$ and $\Delta c$ may be different. In certain examples, the relationship between the second offset $\Delta b$ and the third offset $\Delta c$ corresponds to the configuration of the T/R interface 708. In some examples, the offset $\Delta b$ is less than the offset $\Delta a$ to steer the transmit beam 712 toward the reference line 714.

As described above, the offsets $\Delta a$-$\Delta c$ can be scaled to provide micro-optic beam steering of the transmit beam 712. In this context, "scaled" is used interchangeably with "adjusted" or "modified." In some examples, scaling the offsets $\Delta a$-$\Delta c$ includes a proportional adjustment of the offsets. In other words, after adjusting a first offset (e.g., $\Delta a$), at least one other offset (e.g., $\Delta b$ and/or $\Delta c$) may be subsequently adjusted to maintain a proportional relationship with the first offset. In other examples, scaling the offsets $\Delta a$-$\Delta c$ includes a disproportionate adjustment of one or more offsets relative to the other offsets.

While the LIDAR device 702 is described above as having a 'downward' beam steering configuration, it should be appreciated that the LIDAR device 702 can be configured differently. For example, the LIDAR device 702 may be configured with different component offsets to adjust the beam steering direction. In addition, the components of the LIDAR device 702 may be disposed on a different (e.g., opposite) side or region of the substrate 710 to change the beam steering direction. Alternatively, the LIDAR device assembly 700 may be rotated about an axis parallel to the reference line 714 to adjust the beam steering direction.

Figure 8A:
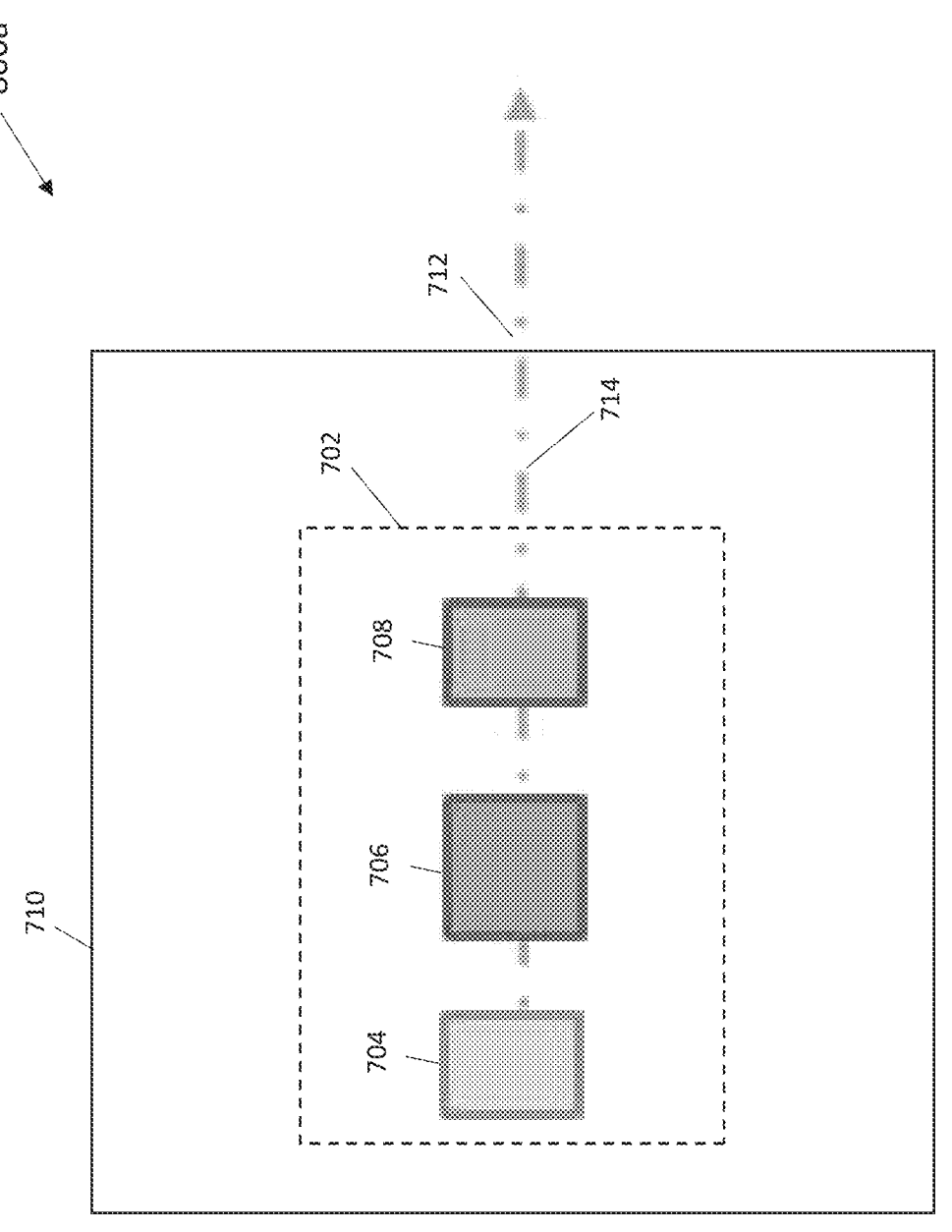
FIGS. 8A-8B are schematic diagrams of LIDAR device assemblies in accordance with some embodiments.

FIG. 8A depicts an example LIDAR device assembly 800a in accordance with aspects described herein. The LIDAR device assembly 800a includes the LIDAR device 702 that is configured to be disposed on the substrate 710. In the illustrated example, the components are disposed on the first (e.g., top) surface of the substrate 710; however, in other examples, the components may be disposed on the second (e.g., bottom) surface of the substrate 710. In one example, the LIDAR device 702 is configured with component offsets such that the components are positioned to transmit or steer the transmit beam 712 in a boresight direction. In other examples, the components of the LIDAR device 712 of FIG. 8A may be aligned such that the transmit beam overlaps with the reference line 714 without any of the components of the LIDAR device 712 performing any beam steering.

As described above, the component offsets $\Delta a$-$\Delta c$ can be scaled relative to the reference line 714 to provide micro-optic beam steering of the transmit beam 712. In one example, the LIDAR device 702 can be configured with a first offset $\Delta a$, a second offset $\Delta b$, and a third offset $\Delta c$ that are all approximately the same to steer the transmit beam 712 in a boresight direction. In one example, the first offset $\Delta a$ of the laser source 704, the second offset $\Delta b$ of the lens 706, and the third offset $\Delta c$ of the T/R interface 708 may each be approximately 0 um. Due to the relationship between the first offset $\Delta a$ and the second offset $\Delta b$, the transmit beam 712 is provided from the laser source 704 to a center portion of the lens 706, causing the transmit beam 712 to be directed in the boresight direction through the T/R interface 708. As shown, the offsets Δa-Δc can be scaled such that the transmit beam 712 intersects the reference line 714 (e.g., at the center of the system lens).

Figure 8B:
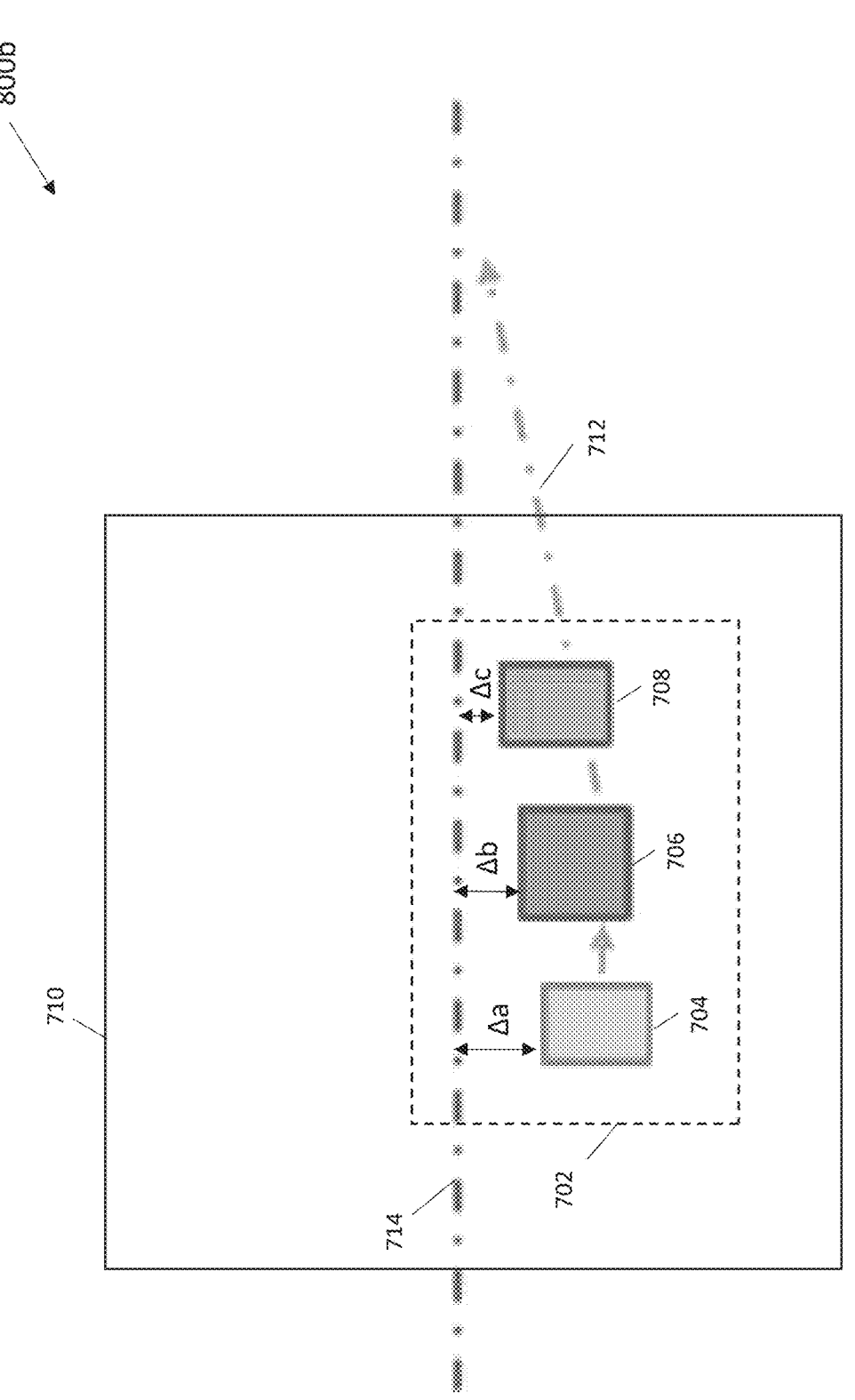

Similarly, FIG. 8B depicts an example of a LIDAR device assembly 800b in accordance with aspects described herein. The LIDAR device assembly 800b includes the LIDAR device 702 that is configured to be disposed on substrate 710. In one example, the LIDAR device 702 is configured with component offsets such that the components are positioned to transmit or steer the transmit beam 712 in a second direction (e.g., an 'upward' direction in the illustration of FIG. 8B).

As described above, the component offsets Δa-Δc can be scaled to provide micro-optic beam steering of the transmit beam 712. Similar to the configuration shown in FIG. 7, the LIDAR device 702 can be configured with a first offset Δa that is larger than the second offset Δb and the third offset Δc to steer the transmit beam 712. In one example, the first offset Δa of the laser source 704 may be approximately 506 μm, the second offset Δb of the lens 706 may be approximately 501.8 μm, and the third offset Δc of the T/R interface 708 may be approximately 500 μm. However, being that the components are disposed on the opposite side of the reference line 714 (e.g., in a lower region of the substrate 710), the transmit beam 712 is provided from the laser source 704 to a lower portion of the lens 706, causing the transmit beam 712 to be directed in the 'upward' direction through the T/R interface 708. In some examples, the second offset Δb of the lens 706 and the third offset Δc of the T/R interface 708 may be approximately the same; however, in other examples, the offsets Δb and Δc may be different. In certain examples, the relationship between the second offset Δb and the third offset Δc corresponds to the configuration of the T/R interface 708. In some examples, the offset Δb is less than the offset Δa to steer the transmit beam 712 toward the reference line 714.

In some examples, rather than disposing the components in the lower region of the substrate 710, the configuration of the LIDAR device assembly 800b can be realized by rotating the LIDAR device assembly 700 of FIG. 7 about an axis parallel to the reference line 714. For example, the LIDAR device assembly 700 may be rotated 180 degrees resulting in a mirrored configuration that provides similar performance to the LIDAR device assembly 800b (beam steering in an upward direction).

In the examples of FIGS. 7, 8A, and 8B, each of the offsets (Δa, Δb, Δc) is illustrated as a distance between a reference line 714 and a component (e.g., 704, 706, 708) of a LIDAR device. In some embodiments, the offset Δa may specifically refer to the distance between the reference line 714 and the chief ray of the transmit beam 712 at the location where the transmit beam is emitted from the laser source 704. In some embodiments, the offset Δb may specifically refer to the distance between the reference line 714 and the chief ray of the transmit beam 712 at the location where transmit beam exits the lens 706. In some embodiments, the offset Δc may specifically refer to the distance between the reference line 714 and the chief ray of the transmit beam 712 at the location where the transmit beam exits the T/R interface 708.

Figure 9:
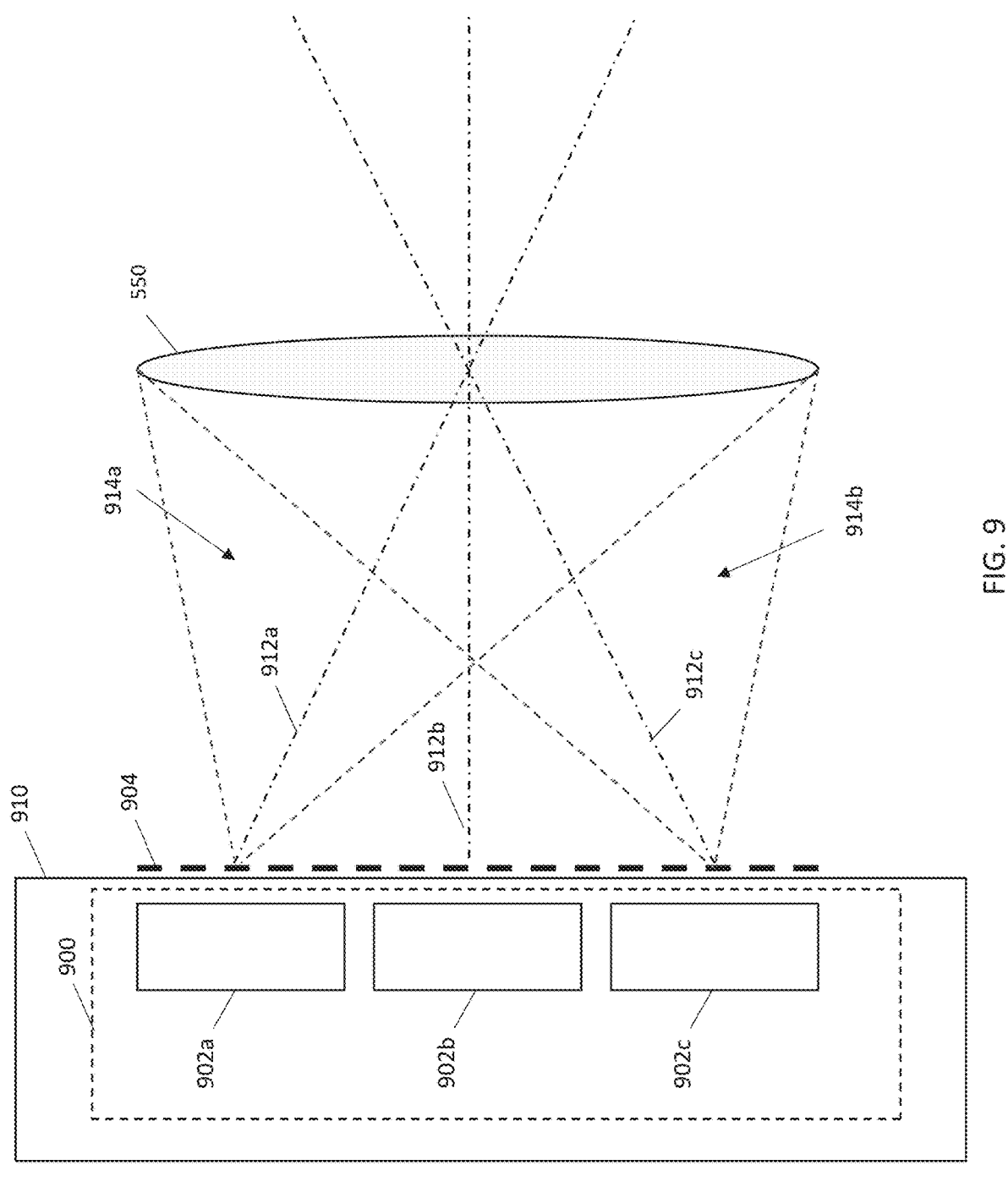
FIG. 9 is a schematic diagram of a LIDAR device array in accordance with some embodiments.

In some examples, being that the LIDAR device 702 is capable of providing micro-optic beam steering, the LIDAR device 702 may be included in a LIDAR array having a linear (or flat) focal plane. For example, FIG. 9 depicts a LIDAR device array 900 in accordance with some embodiments. The LIDAR device array 900 includes a plurality of LIDAR devices 902 including a first device 902a, a second device 902b, and a third device 902c. In one example, each of the LIDAR devices 902 corresponds to the LIDAR device 702. In some examples, all of the LIDAR devices 902 are configured to be disposed on a common substrate 910; however, in other examples, each of the LIDAR devices 902 can be disposed on individual substrates.

The LIDAR devices 902 are positioned along a flat focal plane 904. In one example, one or more of the LIDAR devices 902 include at least one component positioned to steer the channel (e.g., to steer a beam emitted by the channel) towards the center of the lens 550. For example, the first LIDAR device 902a may be configured as shown in FIG. 7 to steer the transmit beam 912a in a downward direction towards the center of the lens 550. The second LIDAR device 902b may be configured as shown in FIG. 8A to transmit the transmit beam 912b in a boresight direction towards the center of the lens 550. The third LIDAR device 902c may be configured as shown in FIG. 8B to steer the transmit beam 912c in an upward direction towards the center of the lens 550. In some examples, the micro-optic beam steering provided by the LIDAR devices 902a and 902c prevents portions of received light from being clipped (i.e., outside the lens 550). As such, by steering each channel towards the center of the lens 550, the LIDAR array 600 can be implemented with a flat focal plane while maintaining desired (e.g., optimized) system performance and reducing (e.g., minimizing) the clipping (or loss) of light at the lens 550 (as indicated by receive cones 914a, 914b).

In some examples, the flat focal plane arrangement of the array 900 allows for a linear channel alignment. As such, the active process of aligning (and/or calibrating) the mirror and/or the lens of the devices 902 may be simplified considerably. In certain examples, the simplified alignment process can reduce the amount of time needed for aligning (and/or calibrating) the array 900, which can decrease manufacturing costs.

While the above examples describe one LIDAR channel per device, it should be appreciated that each of the LIDAR devices may be configured as multi-channel devices. For example, the first LIDAR device 902a may be configured to steer two or more transmit beams in a downward direction towards the center of the lens 550. Likewise, the second LIDAR device 902b may be configured to steer or transmit two or more transmit beams in a boresight direction towards the center of the lens 550. Similarly, the third LIDAR device 902c may be configured to steer two or more transmit beams in an upward direction towards the center of the lens 550. In some examples, all channels within each device 902 may have the same component offset configuration; however, in other examples, at least one channel within each device 902 may have a slightly different component offset configuration than other channels within the same device 902.

In one example, given that the LIDAR devices 902 can be included in a LIDAR array having a linear (or flat) focal plane, the size and cost of the LIDAR array (and the system 100) may be reduced by consolidating the LIDAR devices 902 into a multi-channel LIDAR device.

Figure 10:
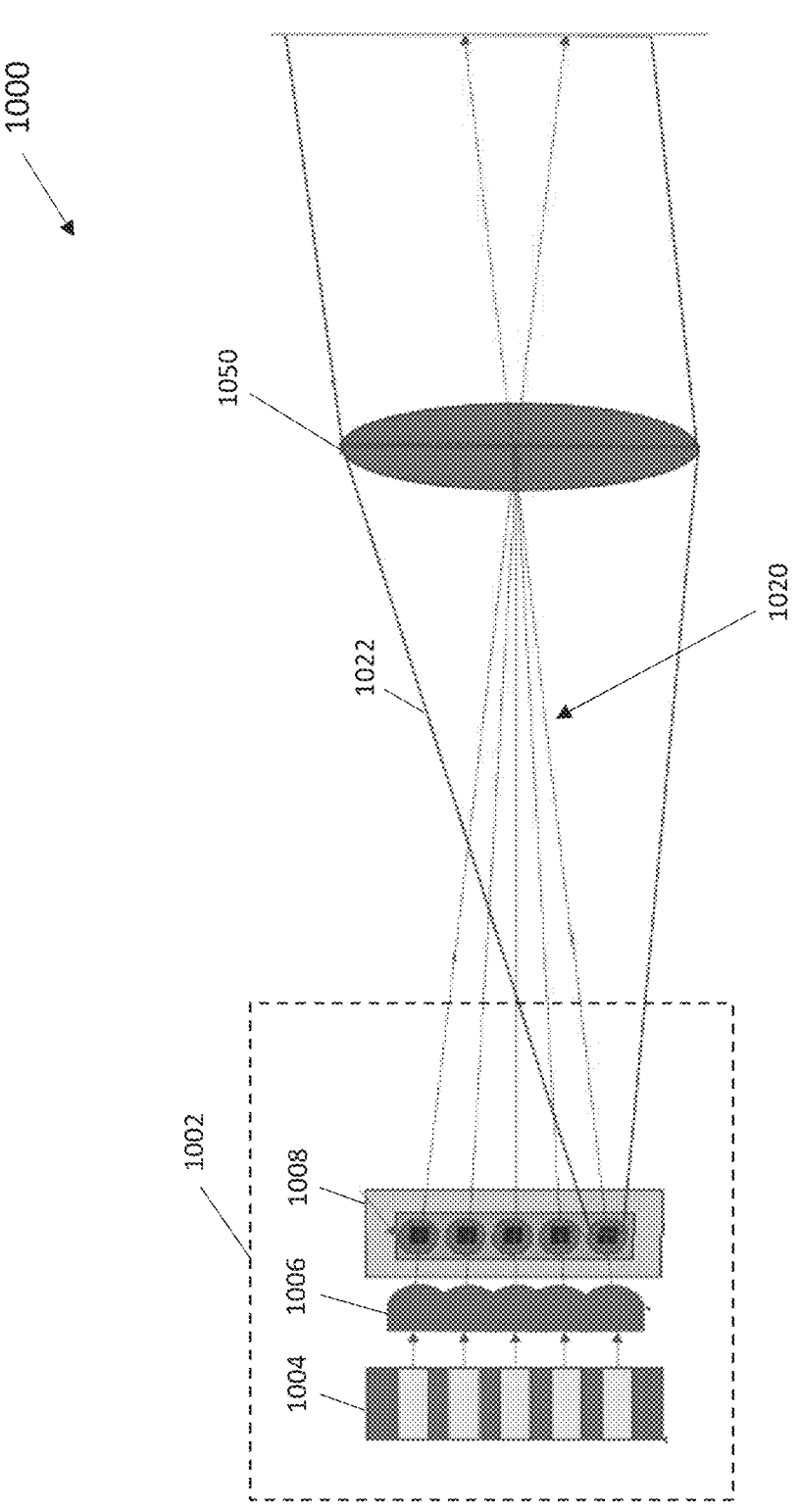
FIG. 10 is a schematic diagram of a multi-channel LIDAR system in accordance with some embodiments.

FIG. 10 is a schematic diagram of a multi-channel LIDAR system 1000. In one example, the LIDAR system 1000 is similar to the LIDAR system 500 of FIG. 5, except the LIDAR system 1000 includes a LIDAR arrangement 1002 having array components. For example, the LIDAR arrangement 1002 includes a laser source array 1004, a lens array 1006, and a T/R interface array 1008. In one example, the T/R interface array 1008 includes a single mirror; however, in other examples, the T/R interface array 1008 may include an array of mirrors rather than a single mirror. In some examples, the T/R interface array 1008 also includes an array of detectors; however, in other examples, the array of detectors can be provided as a separate array component (or device).

The laser source array 1004 is configured to provide a plurality of transmit beams (i.e., light) 1020 to the lens array 1006. The lens array 1006 is an array of micro-optic lenses configured to provide beam shaping and steering functionality at the laser source array 1004. The mirror(s) of the T/R interface array 1008 pass(es) the plurality of transmit beams 1020 and reflects received light 1022 towards the detectors of the detector array. In some examples, the detectors of the detector array are avalanche photodiodes (APDs).

The LIDAR arrangement 1002 is configured to provide multiple LIDAR channels. In one example, each transmit beam of the plurality of transmit beams 1020 corresponds to a single channel and is provided from the laser source array 1004 to a corresponding lens of the lens array 1006. Likewise, each detector of the detector array may correspond to a single channel. In one example, the received light 1022 shown in FIG. 10 represents received light for a single channel. The LIDAR arrangement 1002 may direct the plurality of transmit beams 1020 to a system-level lens 1050 (e.g., beam shaping optical elements 163) before the plurality of transmit beams 1020 are projected into the environment. Likewise, the received light 1022 may be directed to the LIDAR arrangement 1002 via the lens 1050.

Figure 11:
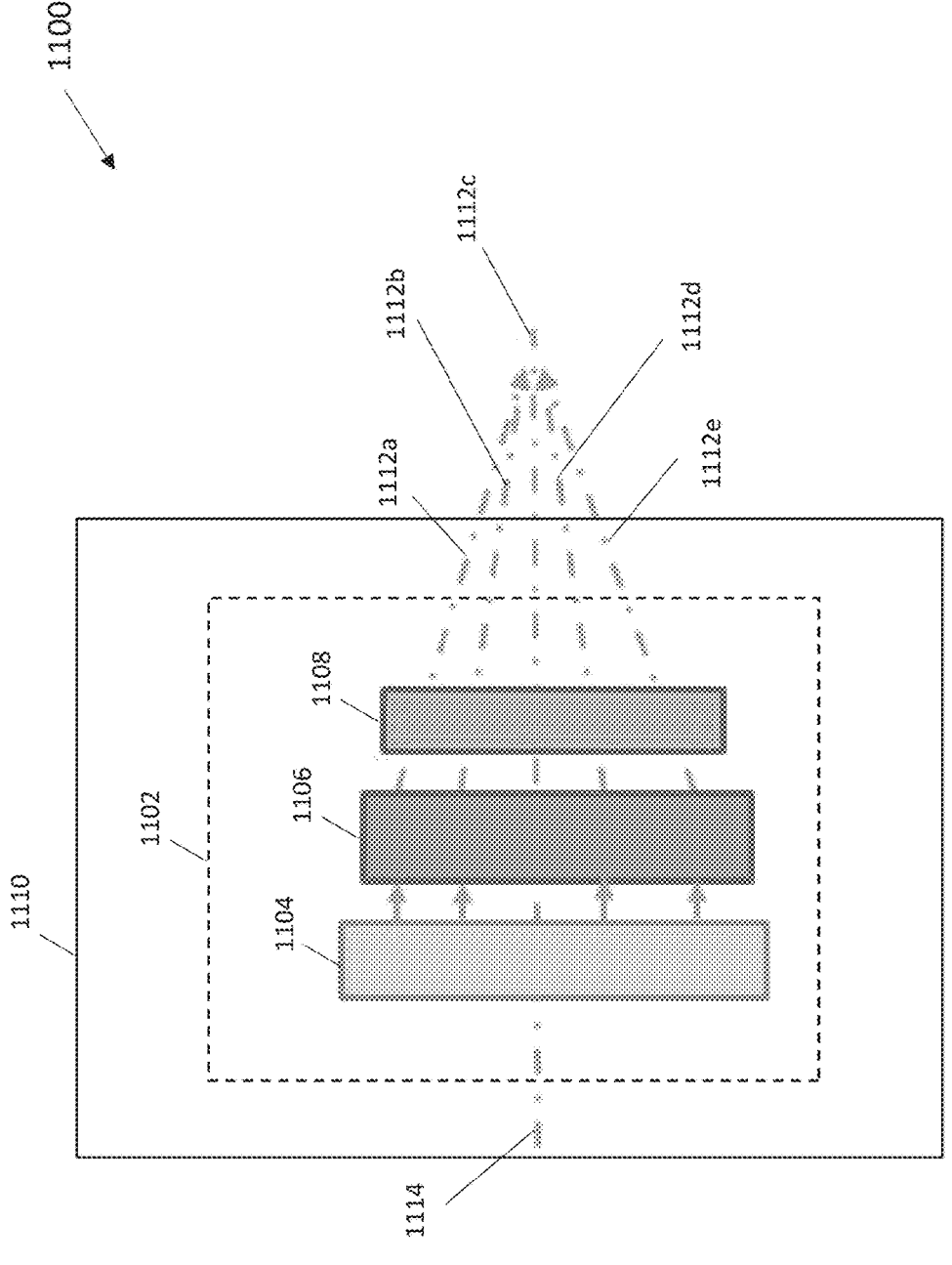
FIG. 11 is a schematic diagram of a LIDAR device assembly in accordance with some embodiments.

In one example, the LIDAR arrangement 1002 can be implemented as a LIDAR device having component pitches (e.g., scaled component pitches) that provide micro-optic beam steering to direct the plurality of transmit beams towards the center of the lens 1050. For example, FIG. 11 depicts a LIDAR device assembly 1100 in accordance with aspects described herein. In one example, the LIDAR device assembly 1100 includes a LIDAR device (e.g., integrated LIDAR device) 1102. The LIDAR device 1102 includes a laser source array 1104, a lens array 1106, and a T/R interface array 1108. In some examples, the laser source array 1104 corresponds to the laser source array 1004, the lens array 1106 corresponds to the lens array 1006, and the T/R interface array 1108 corresponds to the T/R interface array 1008 of the LIDAR arrangement 1002 of FIG. 10. It should be appreciated that the LIDAR device 1100 may be configured to provide any number of channels (e.g., 2, 4, 8, 16, 24, 32, 48, 50, 64, 128, 2-128, or more channels). For example, each channel of the LIDAR device 1100 may correspond to one laser source included in the laser source array 1104, one lens included in the lens array 1106, and one T/R interface included in the T/R interface array 1108. In some examples, each of the components 1104, 1106, and 1108 can be provided (and fabricated) as monolithic arrays.

In one example, the components of the LIDAR device 1102 are configured to be disposed on a substrate 1110. The substrate 1110 may be a printed circuit board (PCB). The components may be disposed on a first surface or a second surface of the substrate 1110. In the illustrated example, the components are disposed on the first (e.g., top) surface of the substrate 1110. In some examples, the components of the LIDAR device 1102 may be disposed on the substrate 1110 within a common device package; however, in other examples, the substrate 1110 may be an external component on which the LIDAR device 1102 is disposed. The components of the LIDAR device 1102 can be electrically and/or mechanically coupled to the substrate 1110.

Similar to the examples described above, each device included in the array components 1104, 1106, and 1108 is positioned with an offset relative to a reference line 1114. For example, the reference line 1114 may correspond to the center (or boresight) line of a system lens (e.g., system lens 1050). As described above, the device offsets can be scaled to provide micro-optic beam steering of a plurality of transmit beams 1112. In some examples, the components 1104, 1106, and 1108 can be configured with scaled device offsets to steer the plurality of transmit beams 1112 in a convergent direction (e.g., towards the center of the lens 1050). In other words, the offset of each device (within a respective array component) can be scaled to adjust the pitch between devices included in each of the components 1104, 1106, and 1108 such that the plurality of transmit beams 1112 converge. For example, the devices included in the components 1104, 1106, and 1108 can be configured such that one or more of channels of the LIDAR device 1102 have a configuration similar to the LIDAR device 702 of FIG. 7 to steer one or more transmit beams in a downward direction (e.g., transmit beams 1112*a*, 1112*b*). Likewise, the devices included in the components 1104, 1106, and 1108 can be configured such that one or more channels of the LIDAR device 1102 have a configuration similar to the LIDAR device 702 of FIG. 8A to transmit or steer one or more transmit beams in a boresight direction (e.g., transmit beam 1112*c*). In addition, the devices included in the components 1104, 1106, and 1108 can be configured such that one or more of channels of the LIDAR device 1102 have a configuration similar to the LIDAR device 702 of FIG. 8B to steer one or more transmit beams in an upward direction (e.g., transmit beams 1112*d*, 1112*e*).

While the LIDAR device 1102 is described above as having a convergent beam steering configuration, it should be appreciated that the LIDAR device 1102 can be configured differently. For example, the devices of each channel included in the components 1104, 1106, and 1108 may be configured with different offsets (or pitches) to adjust the beam steering direction. In addition, the components of the LIDAR device 1102 may be disposed on a different (e.g., opposite) side or region of the substrate 1110 to change the beam steering direction. Alternatively, the LIDAR device assembly 1100 may be rotated about an axis parallel to the reference line 1114 to adjust the beam steering direction. In certain examples, rather than providing a single LIDAR device 1102 having many channels (e.g., 128), it may be beneficial to include several LIDAR devices 1102 in an array (e.g., 4 devices having 32 channels each). As such, the LIDAR device 1102 may be included in a LIDAR array having a linear (or flat) focal plane. For example, the LIDAR device 1102 may be included in the LIDAR device array 900 of FIG. 9 (e.g., as the LIDAR devices 902). Each of the LIDAR devices 1102 included in the array may be configured with different beam steering directions (e.g., upward, downward, boresight, etc.). As described above, the flat focal plane arrangement of the array 900 allows for a linear channel alignment. As such, the active process of aligning (or calibrating) the mirror and/or the lens of the devices 1102 may be simplified considerably. In addition, being that the components are fabricated as monolithic arrays, the channels of each device 1102 can be aligned at the component level (rather than the channel level). For example, if a LIDAR device array includes four LIDAR devices having 32 channels each, the device array may be aligned by aligning the four LIDAR devices rather than 128 individual channels.

As described above, the LIDAR devices provided herein may enable the size of the device arrays (and corresponding LIDAR systems) to be reduced. For example, the flat focal plane arrangement of the LIDAR device array 900 can enable smaller, more efficient layouts compared to LIDAR device arrays having curved focal planes causing excessive device spacing (e.g., LIDAR device array 600 of FIG. 6B). Likewise, the use of integrated LIDAR devices including array components (e.g., device 1102) may allow multiple channels to be provided in a compact form factor.

In addition, the compact and efficient nature of the LIDAR devices and device arrays provided herein may enable more channels to be included in LIDAR systems. As such, these LIDAR devices and device arrays can be used to improve the resolution of LIDAR systems while reducing (or maintaining) the size of the system. In some examples, the LIDAR devices 702, 1102 may be advantageously used in space constrained LIDAR applications. For example, the LIDAR devices 702, 1102 may be used in small, handheld LIDAR devices, such as a device included in a mobile phone (or device that plugs into a mobile phone).

FIG. 12 illustrates a flowchart of a method 1200 suitable for implementation by a LIDAR system as described herein. In some embodiments, LIDAR system 100 is operable in accordance with method 1200 illustrated in FIG. 12. However, in general, the execution of method 1200 is not limited to the embodiments of LIDAR system 100 described with reference to FIG. 1. In some examples, a LIDAR system including the LIDAR devices and/or the device arrays provided herein may be operable in accordance with method 1200 illustrated in FIG. 12. These illustrations and corresponding explanation are provided by way of example as many other embodiments and operational examples may be contemplated.

In block 1201, a plurality of beams of illumination light (e.g., pulsed illumination light) are emitted into a 3-D environment from a plurality of illumination sources (e.g., pulsed illumination sources). Each of the plurality of beams of illumination light is incident on a beam scanning device.

In block 1202, each of the plurality of beams of illumination light is redirected in a different direction based on an optical interaction between each beam of illumination light and the beam scanning device.

In block 1203, an amount of return light reflected from the 3-D environment illuminated by each beam of illumination light is redirected based on an optical interaction between each amount of return light and the beam scanning device.

In block 1204, each amount of return light reflected from the 3-D environment illuminated by each beam of illumination light is detected (e.g., by a photosensitive detector).

In block 1205, an output signal indicative of the detected amount of return light associated with each beam of illumination light is generated.

In block 1206, a distance between the plurality of illumination sources and one or more objects in the 3-D environment is determined based on a difference between a time when each beam of illumination light is emitted from the LIDAR device and a time when each photosensitive detector detects an amount of light reflected from the object illuminated by the beam of illumination light.

Figure 13A:
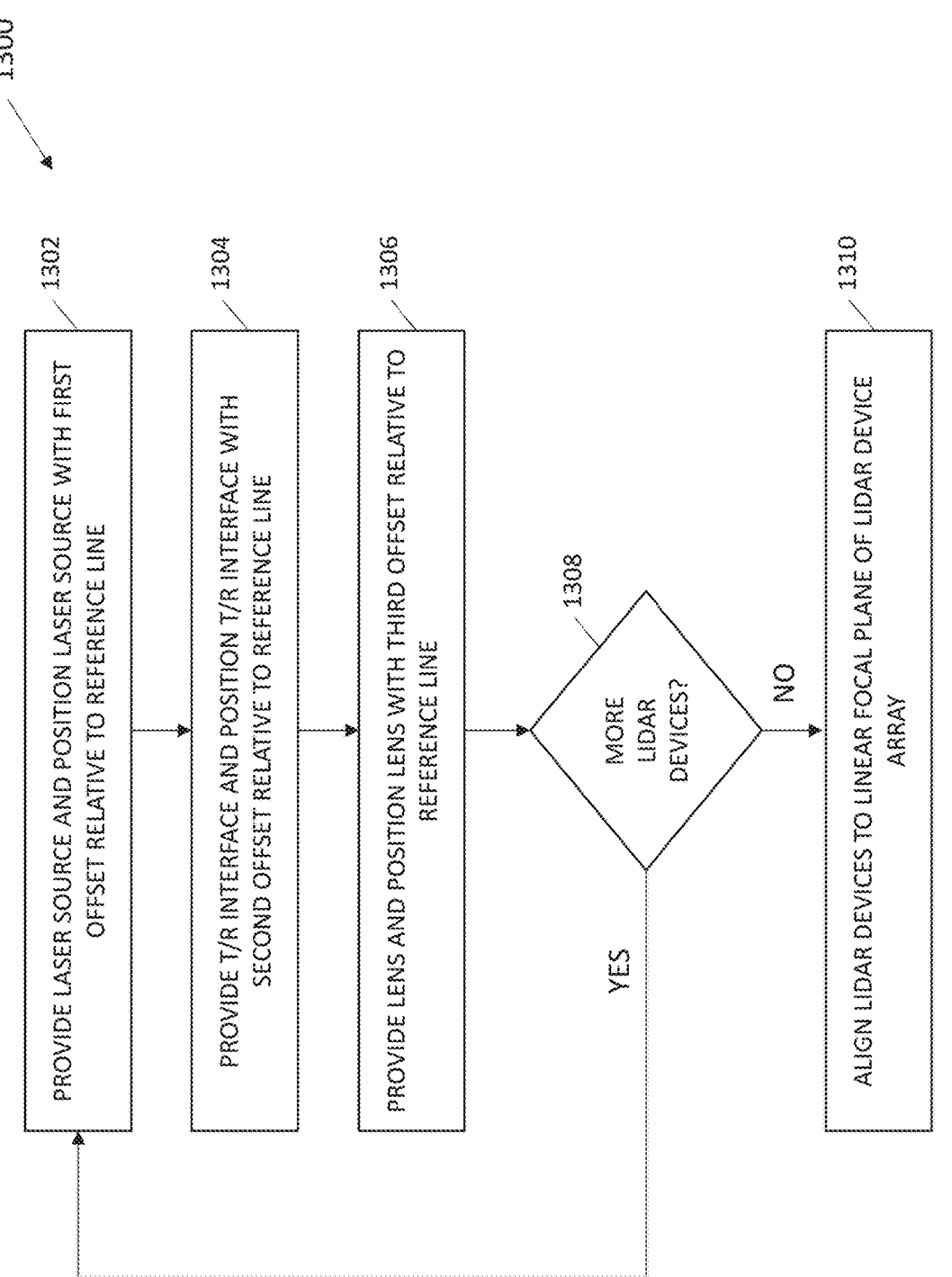
FIG. 13A is a flowchart of a method for manufacturing a LIDAR device array in accordance with some embodiments.

FIG. 13A illustrates a method 1300 for manufacturing a LIDAR device array in accordance with aspects described herein. In one example, the LIDAR device array corresponds to the LIDAR device array 900 including LIDAR devices 902 of FIG. 9.

In block 1302, a laser source is provided. In one example, the laser source (e.g., laser source 712) is configured to provide a transmit beam (e.g., configured to emit a laser beam). In some examples, providing the laser source includes positioning the laser source with a first offset relative to a reference line (e.g., reference line 712).

In block 1304, a T/R interface is provided. In one example, the T/R interface (e.g., T/R interface 708) is configured to pass the transmit beam and reflect received light towards a detector. In some examples, providing the T/R interface includes positioning the T/R interface with a second offset relative to the reference line.

In block 1306, a lens is provided. In one example, the lens (e.g., lens 706) is positioned between the laser source and the T/R interface. In some examples, providing the lens includes positioning the lens with a third offset relative to the reference line.

In one example, the components provided in blocks 1302-1306 correspond to a LIDAR device 902 configured to be included in the LIDAR device array 900. In some examples, the components correspond to a single LIDAR channel. In certain examples, the components of the LIDAR device 902 are configured to be disposed on a substrate (e.g., substrate 910). In some examples, the positions of the components (relative to each other, relative to components of other LIDAR devices in the LIDAR device array, or relative to a reference line) correspond to the position of the LIDAR device 902 in the LIDAR device array 900. For example, the LIDAR device 902 may have a position in an upper region of the substrate (e.g., LIDAR device 902*a*), a middle region of the substrate (e.g., LIDAR device 902*b*), or a lower region of the substrate (e.g., LIDAR device 902*c*). It should be appreciated that the regions described above are provided merely as examples and that the LIDAR device 902 may be positioned in different regions of the substrate.

The component offsets of the LIDAR device 902 can be scaled based on the position of the device in the LIDAR device array 900. In one example, the component offsets can be scaled such that the device steers transmitted light towards the center of a system lens (e.g., lens 550). For example, if positioned in the upper region of the substrate, the component offsets can be scaled such that the device steers transmitted light in a first direction (e.g., a downward direction), similar to the LIDAR device 702 of FIG. 7. If positioned in the middle region of the substrate, the component offsets can be scaled such that the device transmits or steers transmitted light in a second direction (e.g., a boresight direction), similar to the LIDAR device 702 of FIG. 8A. Likewise, if positioned in the lower region of the substrate, the component offsets can be scaled such that the device steers transmitted light in a third direction (e.g., an upward direction), similar to the LIDAR device 702 of FIG. 8B. Again, it should be appreciated that the regions described above are provided merely as examples and that the component offsets of the LIDAR device 902 may be scaled differently based on the configuration of the LIDAR device array 900. In some examples, the component offsets of the LIDAR device 902 can be scaled (e.g., adjusted) using one or more precision die bonder machines.

In block 1308, it is determined if more LIDAR devices 902 are to be added to the LIDAR device array 900. In response to a determination that more LIDAR devices 902 are being added, the method returns to block 1302 and the LIDAR device configuration process repeats. Otherwise, the method continues to block 1310.

In block 1310, the LIDAR devices 902 are aligned to the linear focal plane of the LIDAR device array 900. In some examples, the alignment process includes the use of active alignment equipment (e.g., laser energized equipment) and/ or passive alignment equipment (e.g., camera vision equipment). For example, each LIDAR device 902 may be aligned using an active alignment process that includes energizing the laser source and measuring energy (e.g., light) associated with the transmit beam at the center of the system lens 550. In such a process, the alignment of a LIDAR device 902 may be iteratively adjusted until the energy detected in the transmit beam at the center of the system lens 550 meets or exceeds a threshold energy level. As described above, being that the scaled component offsets of the LIDAR devices 902 provide micro-optic beam steering, the LIDAR devices 902 can be arranged with a linear (or flat) focal plane (e.g., focal plane 904). As such, the process of aligning (and/or calibrating) the mirror and/or the lens of each LIDAR device 902 can be simplified considerably. In certain examples, the simplified alignment process can reduce the amount of time and cost needed for aligning (and/or calibrating) the LIDAR device array 900. In some examples, once the alignment is set, the LIDAR devices 902 and/or the LIDAR device components can be coupled, bonded, attached, and/or fastened to the substrate.

Figure 13B:
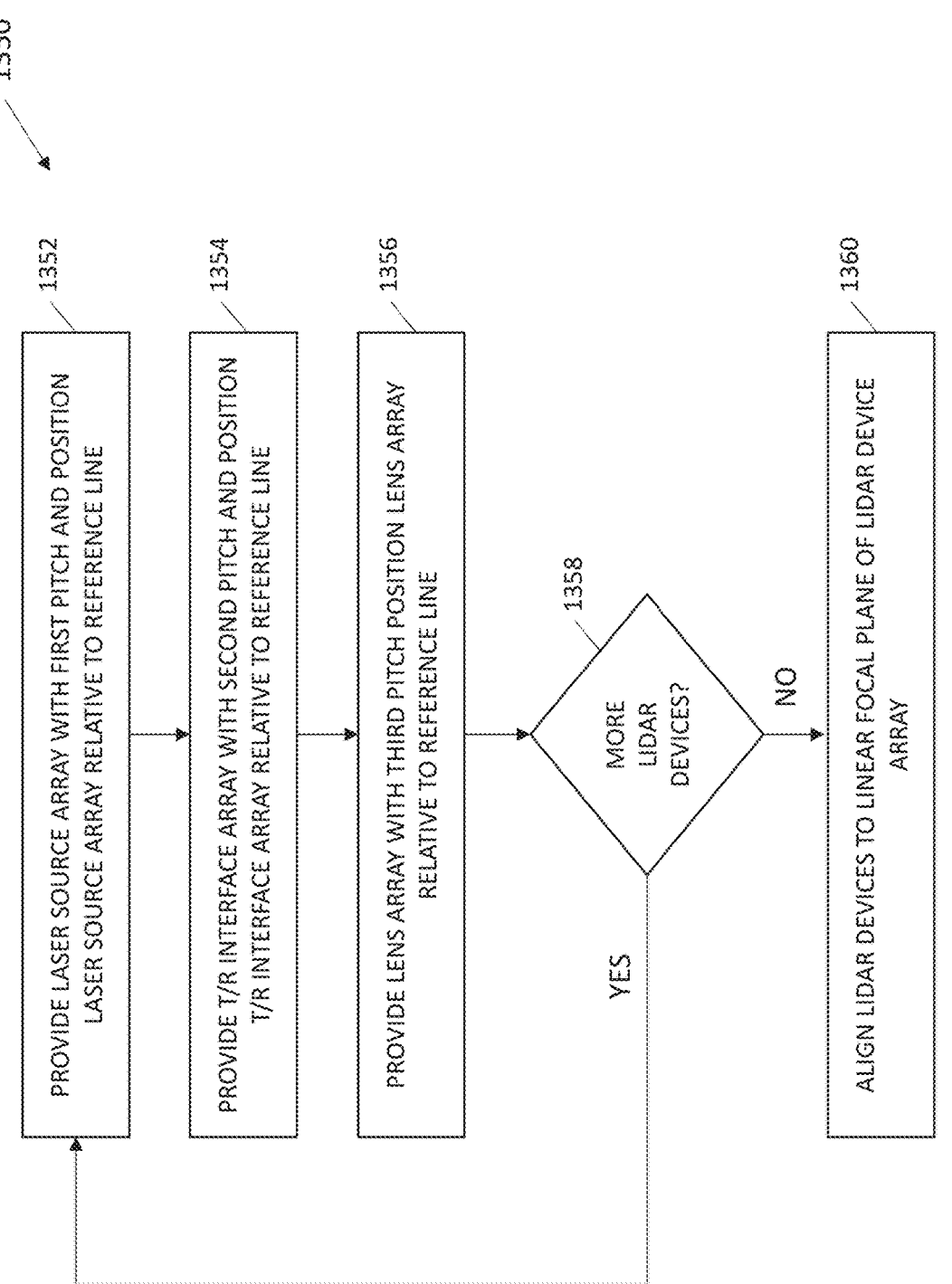
FIG. 13B is a flowchart of another method for manufacturing a LIDAR device array in accordance with some embodiments.

FIG. 13B illustrates another method 1350 for manufacturing a LIDAR device array in accordance with aspects described herein. In one example, the LIDAR device array includes multiple instances of the LIDAR device 1102 of FIG. 11.

In block 1352, a laser source array is provided. In one example, the laser source array (e.g., laser source 1104) includes a plurality of laser sources configured to provide a plurality of transmit beams (e.g., configured to emit a plurality of laser beams). In some examples, providing the laser source array includes positioning each laser source of the plurality of laser sources with a respective offset of a first plurality of offsets relative to a reference line (e.g., reference line 1114). A first pitch between the laser sources included in the laser source array can be scaled to adjust the first plurality of offsets (and the positions of the laser sources). In some examples, the laser source array may be fabricated or pre-assembled on a substrate with the laser sources in the above-described positions (e.g., positioned with the above-described offsets and/or pitch). In some examples, providing the laser source array includes positioning the laser source array (e.g., positioning a first laser source of the laser source array) at a first offset relative to a reference line.

In block 1354, a T/R interface array is provided. In one example, the T/R interface array (e.g., T/R interface array 1108) includes a plurality of T/R interfaces configured to pass the plurality of transmit beams and reflect received light towards a plurality of detectors. In some examples, providing the T/R interface array includes positioning each T/R interface of the plurality of T/R interfaces with a respective offset of a plurality of second offsets relative to the reference line. A second pitch between the T/R interfaces included in the T/R interface array can be scaled to adjust the second plurality of offsets (and the positions of the T/R interfaces). In some examples, the T/R interface array may be fabricated or pre-assembled on a substrate with the T/R interfaces in the above-described positions (e.g., positioned with the above-described offsets and/or pitch). In some examples, providing the T/R interface array includes positioning the T/R interface array (e.g., positioning a first T/R interface of the T/R interface array) at a second offset relative to the reference line.

In block 1356, a lens array is provided. In one example, the lens array (e.g., lens array 1106) is positioned between the plurality of laser sources and the plurality of T/R interfaces. In some examples, providing the lens array includes positioning each lens of the lens array with a respective offset of a third plurality of offsets relative to the reference line. A third pitch between the lenses included in the lens array can be scaled to adjust the third plurality of offsets (and the positions of the lenses). In some examples, the lens array may be fabricated or pre-assembled on a substrate with the lenses in the above-described positions (e.g., positioned with the above-described offsets and/or pitch). In some examples, providing the lens array includes positioning the lens array (e.g., positioning a first lens of the lens array) at a third offset relative to the reference line.

In one example, the array components provided in blocks 1352-1356 correspond to a LIDAR device 1102 configured to be included in the LIDAR device array. In one example, the array components correspond to multiple LIDAR channels. In some examples, the array components 1104, 1106, and 1108 of the LIDAR device 1102 are configured to be disposed on a substrate (e.g., substrate 910). In some examples, the positions of the array components correspond to the position of the LIDAR device 1102 in the LIDAR device array. For example, the LIDAR device 1102 may have a position in an upper region of the substrate (e.g., LIDAR device 902a), a middle region of the substrate (e.g., LIDAR device 902b), or a lower region of the substrate (e.g., LIDAR device 902c). It should be appreciated that the regions described above are provided merely as examples and that the LIDAR device 1102 may be positioned in different regions of the substrate.

The device offsets (or pitches) of the array devices included in each array component 1104, 1106, and 1108 can be scaled based on the position of the LIDAR device 1102 in the LIDAR device array or based on the position of the LIDAR device 1102 relative to a reference line (e.g., a reference line through the center of the system lens). In one example, the device offsets (or pitches) of the array devices can be scaled such that the LIDAR device 1102 transmits light towards the center of a system lens (e.g., lens 550). For example, if positioned in the upper region of the substrate, the device offsets (or pitches) of the array devices can be scaled such that each channel of the LIDAR device 1102 steers transmitted light in a first direction (e.g., a downward direction), similar to the LIDAR device 702 of FIG. 7. If positioned in the middle region of the substrate, the device offsets (or pitches) of the array devices can be scaled such that each channel of the LIDAR device 1102 transmits or steers transmitted light in a second direction (e.g., a boresight direction), similar to the LIDAR device 702 of FIG. 8A. Likewise, if positioned in the lower region of the substrate, the device offsets (or pitches) of the array devices can be scaled such that each channel of the LIDAR device 1102 steers transmitted light in a third direction (e.g., an upward direction), similar to the LIDAR device 702 of FIG. 8B. Again, it should be appreciated that the regions described above are provided merely as examples and that the device offsets (or pitches) of the array devices may be scaled differently based on the configuration of the LIDAR device 1102 or the LiDAR device array. The scaling of device offsets (or pitches) is described in greater detail below with respect to FIGS. 14A, 14B. In some examples, the device offsets (or pitches) of the array devices can be scaled (e.g., adjusted) using one or more precision die bonder machines.

In block 1358, it is determined if more LIDAR devices 1102 are to be added to the LIDAR device array. In response to a determination that more LIDAR devices 1102 are being added, the method returns to block 1352 and the LIDAR device configuration process repeats. Otherwise, the method continues to block 1360.

In block 1360, the LIDAR devices 1102 are aligned to the linear focal plane of the LiDAR device array. In some examples, the alignment process includes the use of active alignment equipment (e.g., laser energized equipment) and/ or passive alignment equipment (e.g., camera vision equipment). For example, each LIDAR device 1102 may be aligned using an active alignment process that includes energizing at least one laser source of the plurality of laser sources and measuring energy (e.g., light) associated with at least one transmit beam at the center of the system lens 550. In such a process, the alignment of a LIDAR device 1102 and/or the alignment of the array components (1104, 1106, 1108) of the LIDAR device 1102 may be iteratively adjusted until the energy detected in the transmit beam at the center of the system lens 550 meets or exceeds a threshold energy level. For example, the alignment of the LIDAR device 1102 may be adjusted with respect to the reference line 1114 or with respect to the system lens 550. In some examples, the alignment of the array components (1104, 1106, 1108) may be adjusted with respect to each other, with respect to the reference line 1114, or with respect to the system lens 550. As described above, being that the scaled pitches of the LIDAR devices 1102 provide micro-optic beam steering, the LIDAR devices 1102 can be arranged with a linear (or flat) focal plane (e.g., focal plane 904). As such, the active process of aligning (and/or calibrating) the mirror and/or the lens of each LIDAR device can be simplified considerably. In addition, being that the LIDAR devices 1102 include array components, the LIDAR devices 1102 can be aligned at the component level, rather than at the channel level. In certain examples, the simplified alignment process can reduce the amount of time and cost needed for aligning (and/or calibrating) the LIDAR device array. In some examples, once the alignment is set, the LIDAR device and/or the array components 1104, 1106, and 1108 of the LIDAR device 1102 can be coupled, bonded, attached, and/or fastened to an underlying substrate.

Figure 14A:
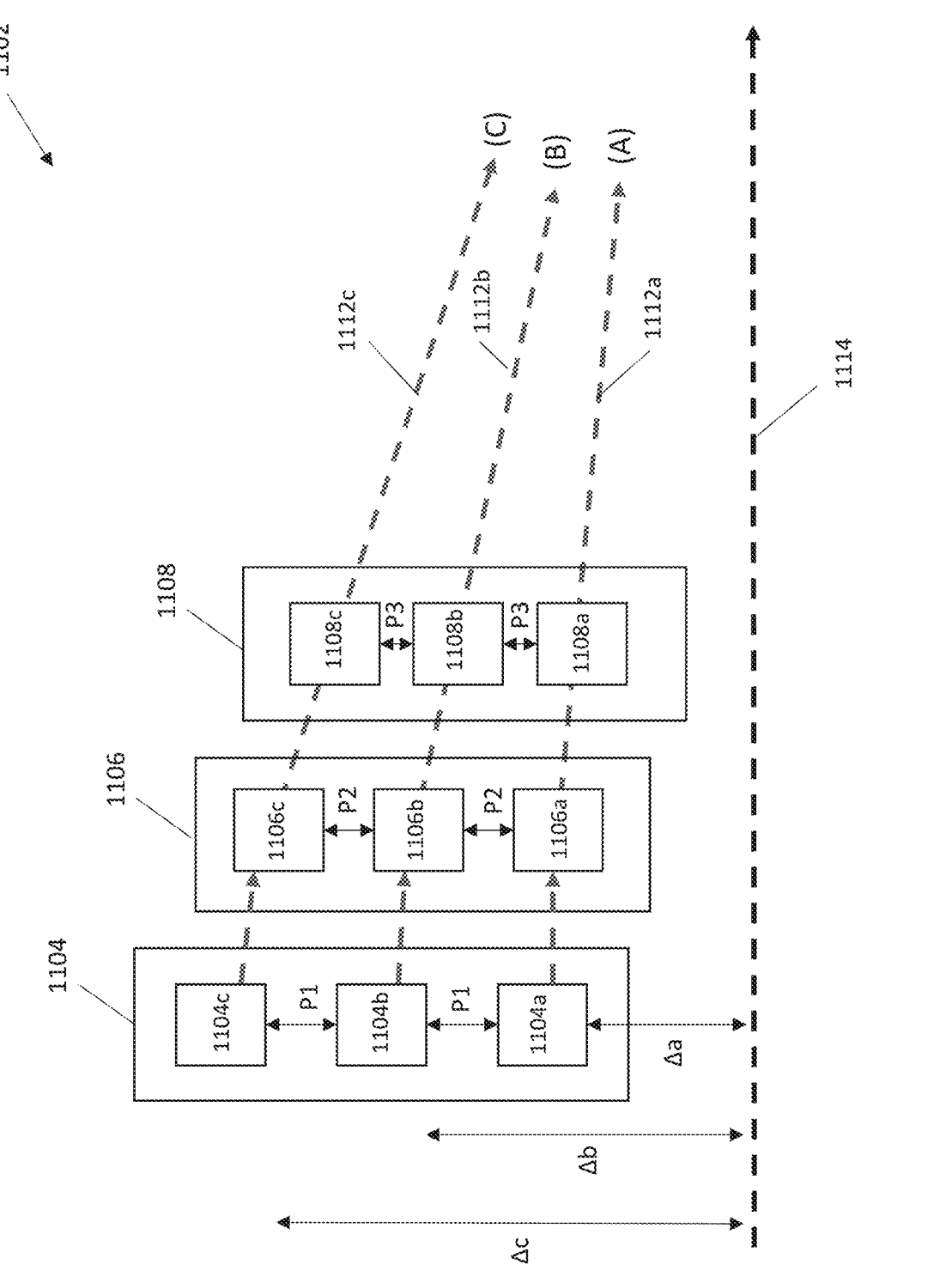
FIG. 14A is a schematic diagram of a LIDAR device in accordance with some embodiments.

Referring to FIG. 14A, an example configuration of the LIDAR device 1102 including array components with scaled device offsets is shown. In the illustrated example, the LIDAR device 1102 includes three LIDAR channels. A first channel (A) includes a first laser source device 1104a of the laser source array 1104, a first lens device 1106a of the lens array 1106, and a first T/R interface device 1108a of the T/R interface array 1108. Likewise, a second channel (B) includes a second laser source device 1104b of the laser source array 1104, a second lens device 1106b of the lens array 1106, and a second T/R interface device 1108b of the T/R interface array 1108; and a third channel (C) includes a third laser source device 1104c of the laser source array 1104, a third lens device 1106c of the lens array 1106, and a third T/R interface device 1108c of the T/R interface array 1108. As shown, the offsets of the devices can be scaled relative to the reference line 1114 to steer the transmit beams 1112 (e.g., the chief rays of each channel). For example, the first laser source device 1104a of the first channel (A) is configured with a first offset Δa to steer, in conjunction with the devices 1106a, 1108a, the first transmit beam 1112a. Likewise, the second laser source device 1104b of the second channel (B) is configured with a second offset Δb to steer, in conjunction with the devices 1106b, 1108b, the second transmit beam 1112b; and the third laser source device 1104c of the third channel (C) is configured with a third offset Δc to steer, in conjunction with the devices 1106c, 1108c, the third transmit beam 1112c. In some examples, the device offsets may be scaled such that the pitches between the devices included in each of the array components 1104, 1106, and 1108 are substantially equal. For example, the device offsets Δa-Δc can be scaled to set a first pitch P1 for the array component 1104 corresponding to the spacings between the laser source devices 1104a-1104c. Likewise, the device offsets of the lens devices 1106 can be scaled to set a second pitch P2 for the array component 1106; and the device offsets of the T/R interface devices 1108 can be scaled to set a third pitch P3 for the array component 1108. In other examples, the device offsets (or pitches) may be configured differently to change the beam steering angles of the transmit beams 1112. For example, the device offsets can be scaled such that the pitches between devices of the same array component are different. In other examples the device offsets (or pitches) can be scaled to transmit or steer the transmit beams 1112 in different directions (e.g., boresight, upward, etc.).

Figure 14B:
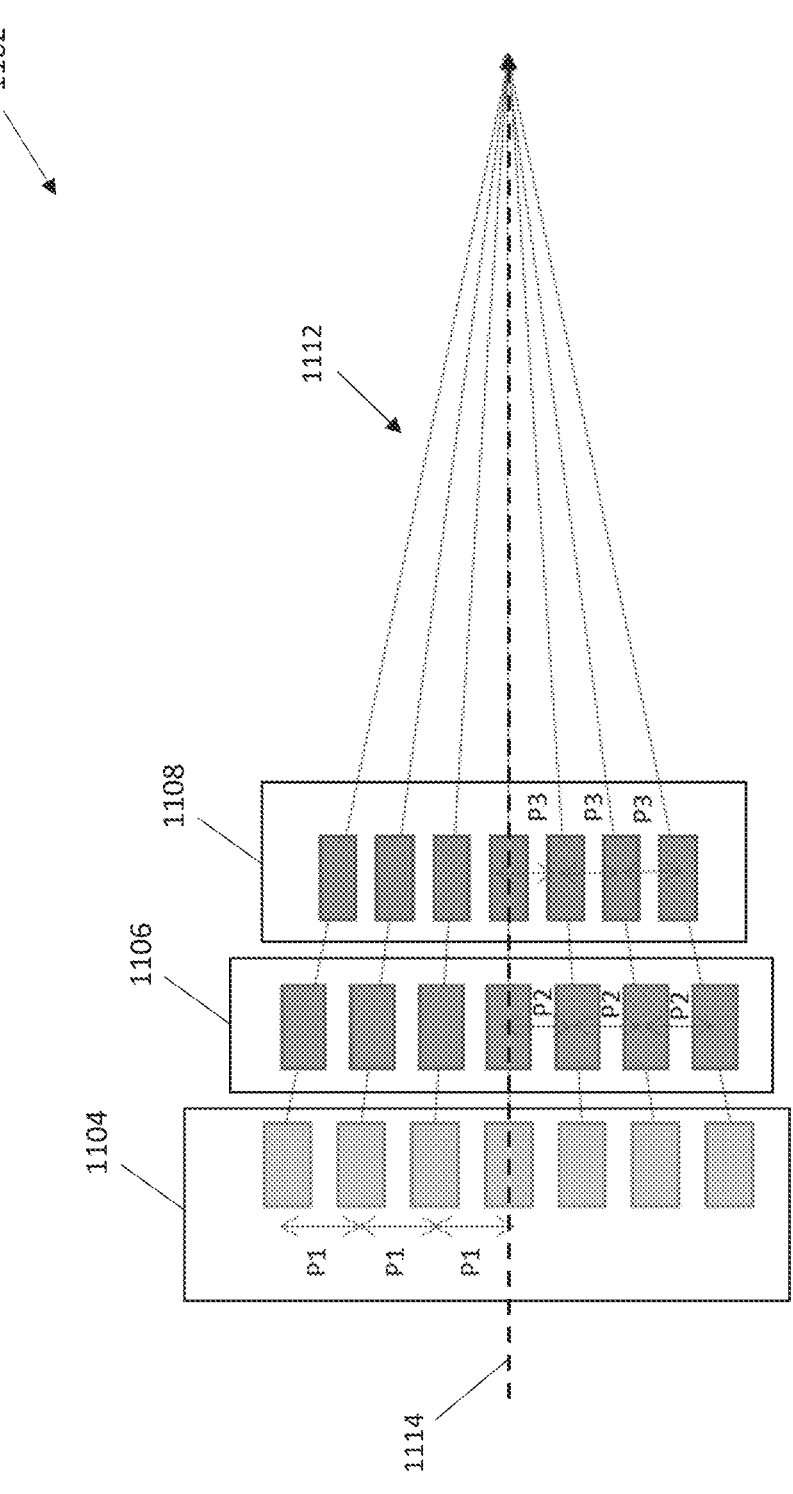
FIG. 14B is a schematic diagram of a LIDAR device in accordance with some embodiments.

While the example illustrated in FIG. 14A depicts the transmit beams 1112 being steered to converge at a common point (e.g., the center of system lens 1050), it should be appreciated that in other examples the transmit beams 1112 can be steered differently. For example, the LIDAR device 1102 may be configured such that the transmit beams 1112 diverge away from a common point. In other examples, the transmit beams 1112 can be steered such that the beams are transmitted in a parallel manner. Referring to FIG. 14B, another example configuration of the LIDAR device 1102 including array components with scaled device pitches is shown. In the illustrated example, the LIDAR device 1102 includes seven LIDAR channels, where each channel includes a device from the laser source array 1104, the lens array 1106, and the T/R interface array 1108. As shown, the device pitches of the components 1104, 1106, and 1108 can be scaled to steer the transmit beams 1112. For example, the laser source array 1104 is configured with a first device pitch P1, the lens array 1106 is configured with a second device pitch P2, and the T/R interface array 1108 is configured with a third device pitch P3 to steer the transmit beams 1112 in a convergent direction (e.g., towards the center of the systems lens 1050). In one example, the first pitch P1 is scaled to be larger than the second pitch P2 and the third pitch P3 to steer the transmit beams 1112 in the convergent direction. In some examples, the second pitch P2 is larger than the third pitch P3; however, in other examples, the second pitch P2 and the third pitch P3 may be substantially the same. As described above, the device pitches P1-P3 may be set by scaling the device offsets relative to the reference line 1114.

As described above, the pitches P1-P3 can be scaled to provide micro-optic beam steering of the transmit beam 1112. In this context, "scaled" is used interchangeably with "adjusted," "selected," or "modified." In some examples, scaling the pitches P1-P3 includes a proportional adjustment of the pitches. In other words, after adjusting a pitch (e.g., P1), at least one other pitch (e.g., P2 and/or P3) may be subsequently adjusted to maintain a proportional relationship with the adjusted pitch. In other examples, scaling the pitches P1-P3 includes a disproportionate adjustment of one or more pitches relative to the other pitches.

Referring again to FIG. 1, master controller 190 or any external computing system may include, but is not limited to, a personal computer system, mainframe computer system, workstation, image computer, parallel processor, or any other device known in the art. In general, the term "computing system" may be broadly defined to encompass any device having one or more processors, which execute instructions from a memory medium.

Program instructions 192 implementing methods such as those described herein may be transmitted over a transmission medium such as a wire, cable, or wireless transmission link. For example, as illustrated in FIG. 1, program instructions 192 stored in memory 191 are transmitted to processor 195 over bus 194. Program instructions 192 are stored in a computer readable medium (e.g., memory 191). Exemplary computer-readable media include read-only memory, a random access memory, a magnetic or optical disk, or a magnetic tape.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As described above, an improved integrated LIDAR device and device array is provided herein. In at least one embodiment, the pitch of at least one component included in the LIDAR device is scaled to provide micro-optic beam steering. In some examples, the micro-optic beam steering allows the LIDAR device to be included in a device array having a linear (or flat) focal plane arrangement. As such, the size of the LIDAR device array (and the LIDAR measurement system) can be reduced. In certain examples, the time and cost per channel alignment of the LIDAR device array can be reduced by using multi-channel array components that are aligned at the component level.

Some Examples of Continuous Wave (CW) LiDAR Systems

As discussed above, some LiDAR systems may use a continuous wave (CW) laser to detect the range and/or velocity of targets, rather than pulsed TOF techniques. Such systems include continuous wave (CW) coherent LiDAR systems and frequency modulated continuous wave (FMCW) coherent LiDAR systems. For example, any of the LiDAR systems (e.g., LiDAR system 100, 210, 300, 400, 800, 900, or 1200) described above can be configured to operate as an FMCW coherent LiDAR system.

Figure 15:
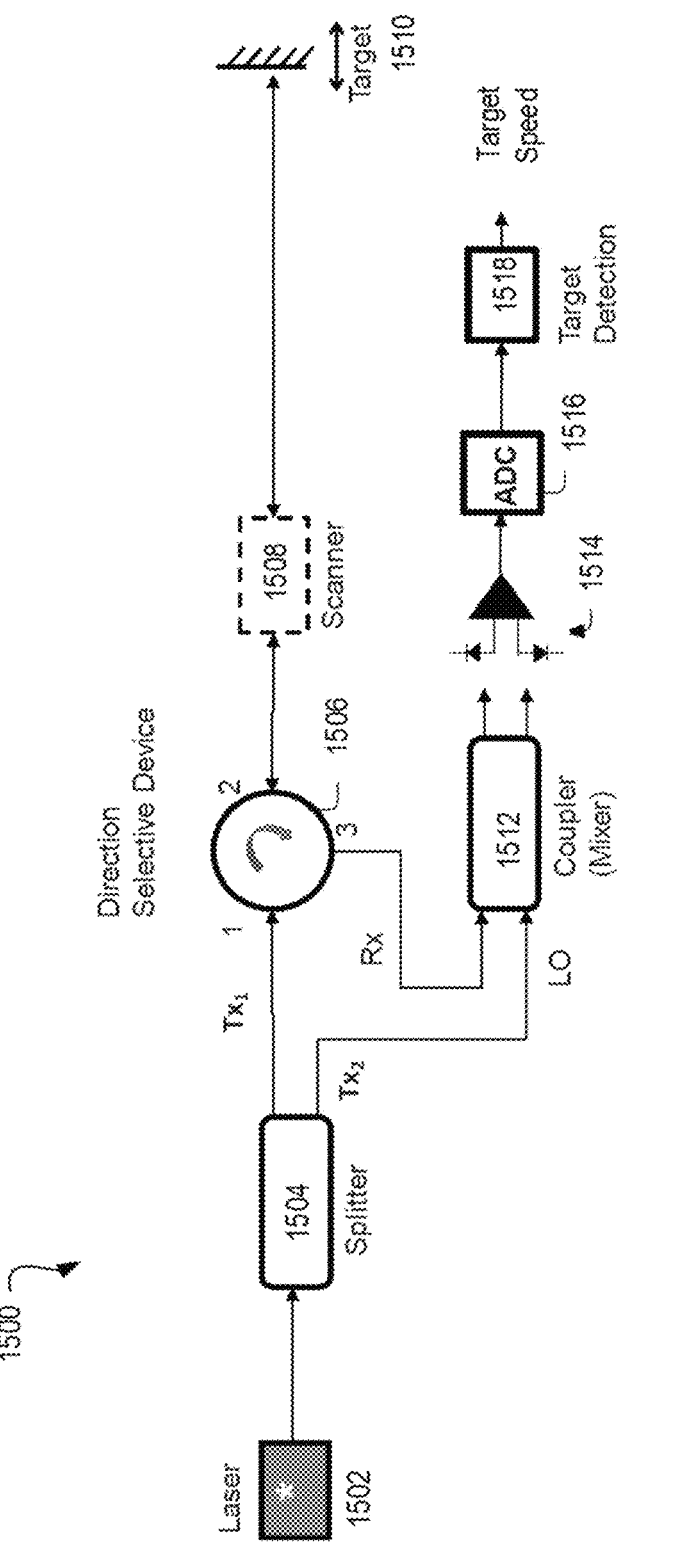
FIG. 15 is an illustration of an example continuous wave (CW) coherent LIDAR system.

FIG. 15 illustrates an exemplary CW coherent LiDAR system 1500 configured to determine the radial velocity of a target. LiDAR system 1500 includes a laser 1502 configured to produce a laser signal which is provided to a splitter

1504. The laser 1502 may provide a laser signal having a substantially constant laser frequency.

In one example, a splitter 1504 provides a first split laser signal Tx1 to a direction selective device 1506, which provides (e.g., forwards) the signal Tx1 to a scanner 1508. In some examples, the direction selective device 1506 is a circulator. The scanner 1508 uses the first laser signal Tx1 to transmit light emitted by the laser 1502 and receives light reflected by the target 1510 (e.g., "reflected light" or "reflections"). The reflected light signal Rx is provided (e.g., passed back) to the direction selective device 1506. The second laser signal Tx2 and reflected light signal Rx are provided to a coupler (also referred to as a mixer) 1512. The mixer may use the second laser signal Tx2 as a local oscillator (L0) signal and mix it with the reflected light signal Rx. The mixer 1512 may be configured to mix the reflected light signal Rx with the local oscillator signal L0 to generate a beat frequency $f_{beat}$ when detected by a differential photodetector 1514. The beat frequency $f_{beat}$ from the differential photodetector 1514 output is configured to produce a current based on the received light. The current may be converted to voltage by an amplifier (e.g., transimpedance amplifier (TIA)), which may be provided (e.g., fed) to an analog-to-digital converter (ADC) 1516 configured to convert the analog voltage signal to digital samples for a target detection module 1518. The target detection module 1518 may be configured to determine (e.g., calculate) the radial velocity of the target 1510 based on the digital sampled signal with beat frequency $f_{beat}$.

In one example, the target detection module 1518 may identify Doppler frequency shifts using the beat frequency $f_{beat}$ and determine the radial velocity of the target 1510 based on those shifts. For example, the velocity of the target 1510 can be calculated using the following relationship:

$$f_d = \frac{2}{\lambda} v_t$$

where, $f_d$ is the Doppler frequency shift, $\lambda$ is the wavelength of the laser signal, and $v_t$ is the radial velocity of the target 1510. In some examples, the direction of the target 1510 is indicated by the sign of the Doppler frequency shift $f_d$. For example, a positive signed Doppler frequency shift may indicate that the target 1510 is traveling towards the system 1500 and a negative signed Doppler frequency shift may indicate that the target 1510 is traveling away from the system 1500.

In one example, a Fourier Transform calculation is performed using the digital samples from the ADC 1516 to recover the desired frequency content (e.g., the Doppler frequency shift) from the digital sampled signal. For example, a controller (e.g., target detection module 1518) may be configured to perform a Discrete Fourier Transform (DFT) on the digital samples. In certain examples, a Fast Fourier Transform (FFT) can be used to calculate the DFT on the digital samples. In some examples, the Fourier Transform calculation (e.g., DFT) can be performed iteratively on different groups of digital samples to generate a target point cloud.

While the LiDAR system 1500 is described above as being configured to determine the radial velocity of a target, it should be appreciated that the system can be configured to determine the range and/or radial velocity of a target. For example, the LIDAR system 1500 can be modified to use laser chirps to detect the velocity and/or range of a target.

Figure 16:
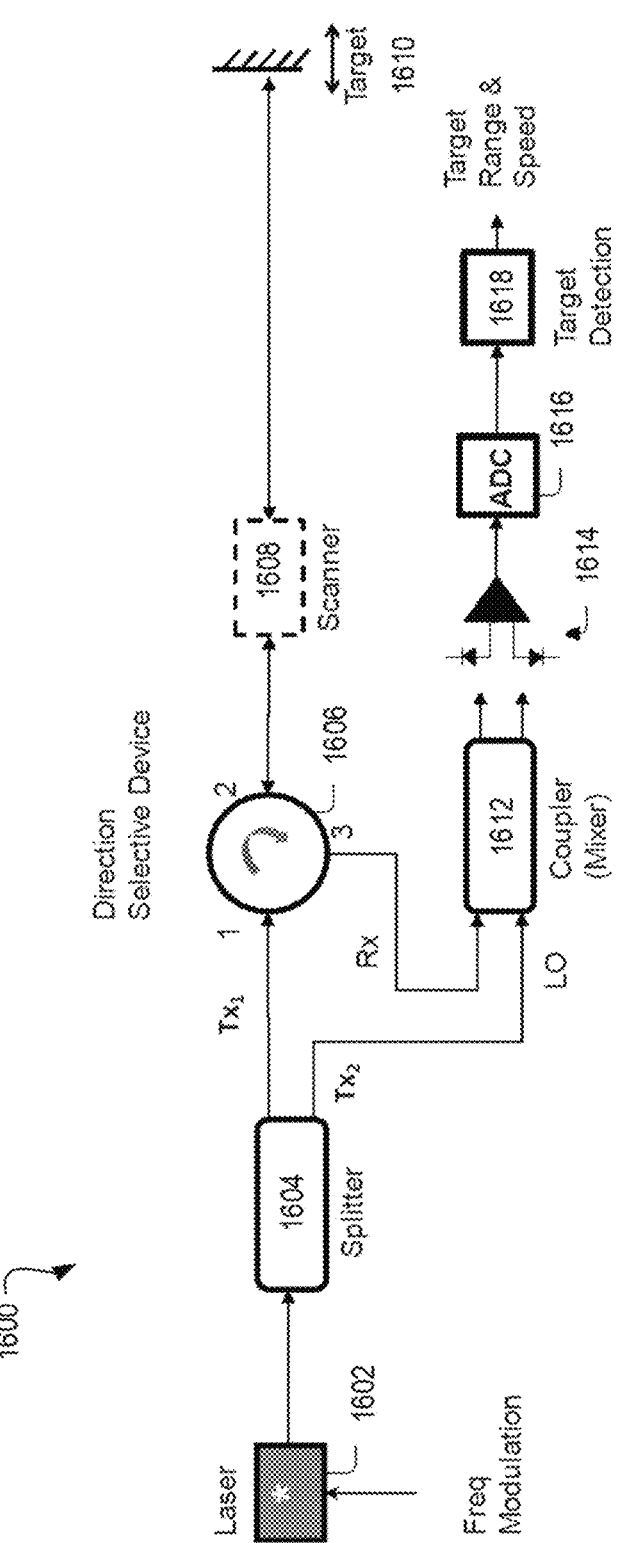
FIG. 16 is an illustration of an example frequency modulated continuous wave (FMCW) coherent LIDAR system.

FIG. 16 illustrates an exemplary FMCW coherent LiDAR system 1600 configured to determine the range and/or radial velocity of a target. LiDAR system 1600 includes a laser 1602 configured to produce a laser signal which is fed into a splitter 1604. The laser is "chirped" (e.g., the center frequency of the emitted laser beam is increased ("ramped up" or "chirped up") or decreased ("ramped down" or "chirped down") over time (or, equivalently, the central wavelength of the emitted laser beam changes with time within a waveband). In various embodiments, the laser frequency is chirped quickly such that multiple phase angles are attained. In one example, the frequency of the laser signal is modulated by changing the laser operating parameters (e.g., current/voltage) or using a modulator included in the laser source 1602; however, in other examples, an external modulator can be placed between the laser source 1602 and the splitter 1604.

In other examples, the laser frequency can be "chirped" by modulating the phase of the laser signal (or light) produced by the laser 1602. In one example, the phase of the laser signal is modulated using an external modulator placed between the laser source 1602 and the splitter 1604; however, in some examples, the laser source 1602 may be modulated directly by changing operating parameters (e.g., current/voltage) or include an internal modulator. Similar to frequency chirping, the phase of the laser signal can be increased ("ramped up") or decreased ("ramped down") over time.

Some examples of systems with FMCW-based LiDAR sensors have been described. However, the techniques described herein may be implemented using any suitable type of LiDAR sensors including, without limitation, any suitable type of coherent LiDAR sensors (e.g., phase-modulated coherent LiDAR sensors). With phase-modulated coherent LiDAR sensors, rather than chirping the frequency of the light produced by the laser (as described above with reference to FMCW techniques), the LiDAR system may use a phase modulator placed between the laser 1602 and the splitter 1604 to generate a discrete phase modulated signal, which may be used to measure range and radial velocity.

As shown, the splitter 1604 provides a first split laser signal Tx1 to a direction selective device 1606, which provides (e.g., forwards) the signal Tx1 to a scanner 1608. The scanner 1608 uses the first laser signal Tx1 to transmit light emitted by the laser 1602 and receives light reflected by the target 1610. The reflected light signal Rx is provided (e.g., passed back) to the direction selective device 1606. The second laser signal Tx2 and reflected light signal Rx are provided to a coupler (also referred to as a mixer) 1612. The mixer may use the second laser signal Tx2 as a local oscillator (LO) signal and mix it with the reflected light signal Rx. The mixer 1612 may be configured to mix the reflected light signal Rx with the local oscillator signal LO to generate a beat frequency $f_{beat}$. The mixed signal with beat frequency $f_{beat}$ may be provided to a differential photodetector 1614 configured to produce a current based on the received light. The current may be converted to voltage by an amplifier (e.g., a transimpedance amplifier (TIA)), which may be provided (e.g., fed) to an analog-to-digital converter (ADC) 1616 configured to convert the analog voltage to digital samples for a target detection module 1618. The target detection module 1618 may be configured to determine (e.g., calculate) the range and/or radial velocity of the target 1610 based on the digital sampled signal with beat frequency $f_{beat}$.

Laser chirping may be beneficial for range (distance) measurements of the target. In comparison, Doppler frequency measurements are generally used to measure target velocity. Resolution of distance can depend on the bandwidth size of the chirp frequency band such that greater bandwidth corresponds to finer resolution, according to the following relationships:

$$\text{Range resolution}: \Delta R = \frac{c}{2BW}\text{(given a perfectly linear chirp),}$$

$$\text{and Range}: R = \frac{f_{beat}cT_{ChirpRamp}}{2BW}$$

where c is the speed of light, BW is the bandwidth of the chirped laser signal, $f_{beat}$ is the beat frequency, and $T_{ChirpRamp}$ is the time period during which the frequency of the chirped laser ramps up (e.g., the time period corresponding to the up-ramp portion of the chirped laser). For example, for a distance resolution of 3.0 cm, a frequency bandwidth of 5.0 GHz may be used. A linear chirp can be an effective way to measure range and range accuracy can depend on the chirp linearity. In some instances, when chirping is used to measure target range, there may be range and velocity ambiguity. In particular, the reflected signal for measuring velocity (e.g., via Doppler) may affect the measurement of range. Therefore, some exemplary FMCW coherent LiDAR systems may rely on two measurements having different slopes (e.g., negative and positive slopes) to remove this ambiguity. The two measurements having different slopes may also be used to determine range and velocity measurements simultaneously.

Figures 17A, 17B:
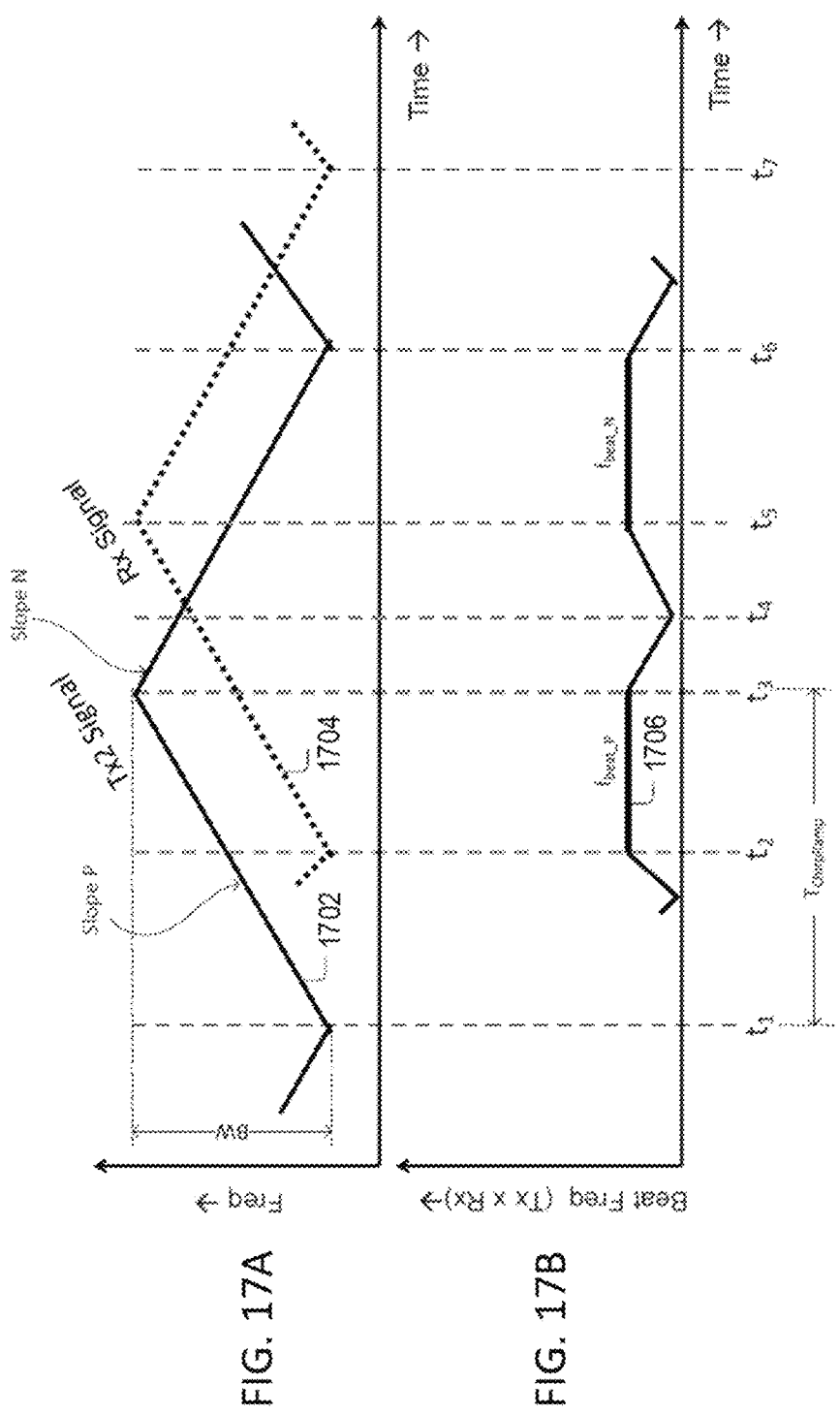
FIG. 17A is a plot of a frequency chirp as a function of time in a transmitted laser signal and reflected signal.
FIG. 17B is a plot illustrating a beat frequency of a mixed signal.

FIG. 17A is a plot of ideal (or desired) frequency chirp as a function of time in the transmitted laser signal Tx (e.g., signal Tx2), depicted in solid line 1702, and reflected light signal Rx, depicted in dotted line 1704. As depicted, the ideal Tx signal has a positive linear slope between time t1 and time t3 and a negative linear slope between time t3 and time t6. Accordingly, the ideal reflected light signal Rx returned with a time delay td of approximately t2–t1 has a positive linear slope between time t2 and time t5 and a negative linear slope between time t5 and time t7.

FIG. 17B is a plot illustrating the corresponding ideal beat frequency $f_{beat}$ 1706 of the mixed signal Tx2×Rx. Note that the beat frequency $f_{beat}$ 1706 has a constant value between time t2 and time t3 (corresponding to the overlapping up-slopes of signals Tx2 and Rx) and between time t5 and time t6 (corresponding to the overlapping down-slopes of signals Tx2 and Rx).

The positive slope ("Slope P") and the negative slope ("Slope N") (also referred to as positive ramp (or up-ramp) and negative ramp (or down-ramp), respectively) can be used to determine range and/or velocity. In some instances, referring to FIGS. 17A-17B, when the positive and negative ramp pair is used to measure range and velocity simultaneously, the following relationships are utilized:

$$\text{Range}: R = \frac{cT_{ChirpRamp}\frac{(f_{beat\_P} + f_{beat\_N})}{2}}{2BW},$$

$$\text{and Velocity}: V = \frac{\lambda\frac{(f_{beat\_P} + f_{beat\_N})}{2}}{2}$$

where $f_{beat\_P}$ and $f_{beat\_N}$ are beat frequencies generated during positive (P) and negative (N) slopes of the chirp 1702 respectively and $\lambda$ is the wavelength of the laser signal.

In one example, the scanner 1608 of the LiDAR system 1600 is used to scan the environment and generate a target point cloud from the acquired scan data. In some examples, the LiDAR system 1600 can use processing methods that include performing one or more Fourier Transform calculations, such as a Fast Fourier Transform (FFT) or a Discrete Fourier Transform (DFT), to generate the target point cloud from the acquired scan data. Being that the system 1600 is capable of measuring range, each point in the point cloud may have a three-dimensional location (e.g., x, y, and z) in addition to radial velocity. In some examples, the x-y location of each target point corresponds to a radial position of the target point relative to the scanner 1608. Likewise, the z location of each target point corresponds to the distance between the target point and the scanner 1608 (e.g., the range). In one example, each target point corresponds to one frequency chirp 1702 in the laser signal. For example, the samples collected by the system 1600 during the chirp 1702 (e.g., t1 to t6) can be processed to generate one point in the point cloud.

Hardware and Software Implementations

Figure 18:
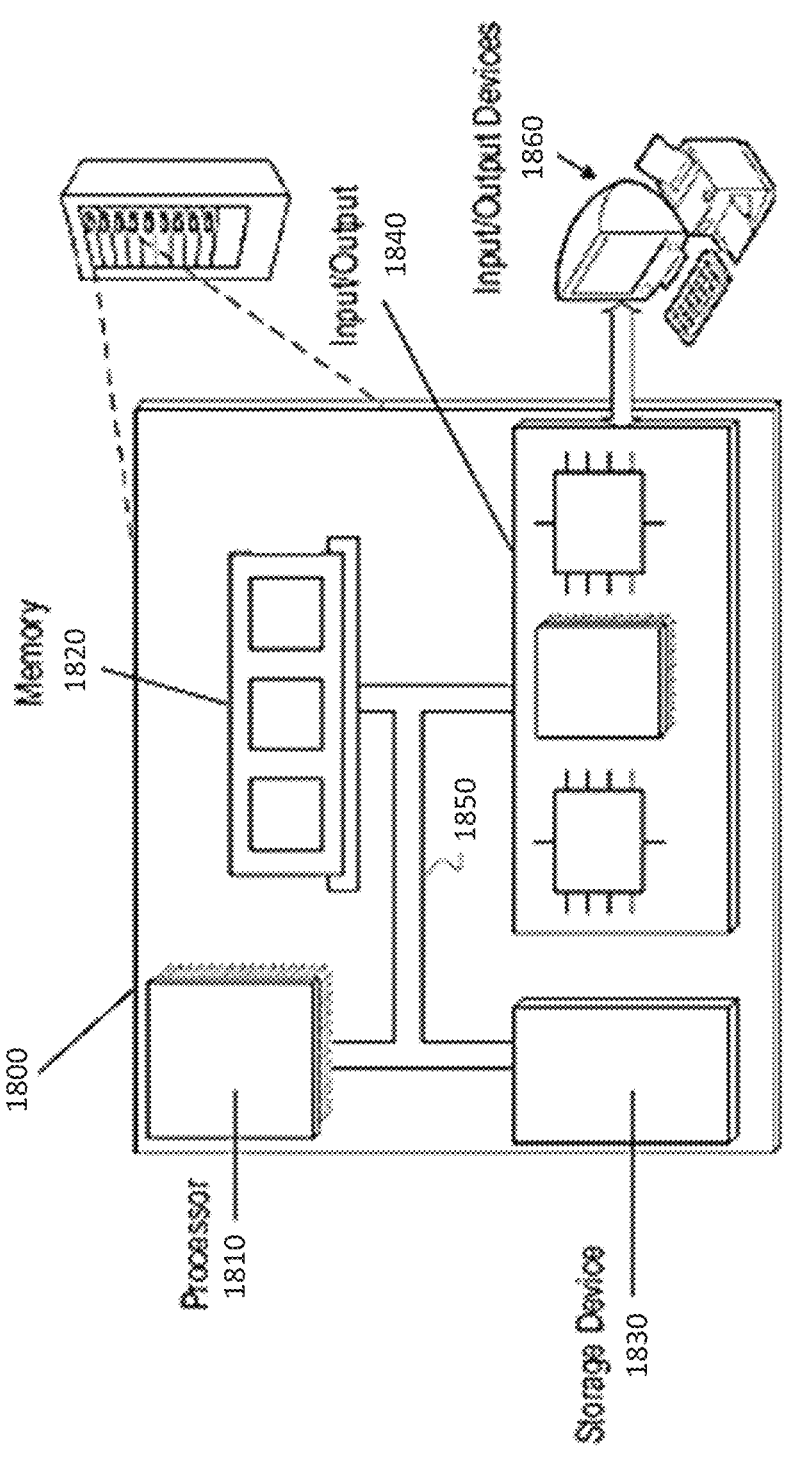
FIG. 18 is a diagram of an exemplary hardware and software system implementing the systems and methods described herein.

FIG. 18 is a block diagram of an example computer system 1800 that may be used in implementing the technology described in this document. General-purpose computers, network appliances, mobile devices, or other electronic systems may also include at least portions of the system 1800. The system 1800 includes a processor 1810, a memory 1820, a storage device 1830, and an input/output device 1840. Each of the components 1810, 1820, 1830, and 1840 may be interconnected, for example, using a system bus 1850. The processor 1810 is capable of processing instructions for execution within the system 1800. In some implementations, the processor 1810 is a single-threaded processor. In some implementations, the processor 1810 is a multi-threaded processor. The processor 1810 is capable of processing instructions stored in the memory 1820 or on the storage device 1830.

The memory 1820 stores information within the system 1800. In some implementations, the memory 1820 is a non-transitory computer-readable medium. In some implementations, the memory 1820 is a volatile memory unit. In some implementations, the memory 1820 is a non-volatile memory unit.

The storage device 1830 is capable of providing mass storage for the system 1800. In some implementations, the storage device 1830 is a non-transitory computer-readable medium. In various different implementations, the storage device 1830 may include, for example, a hard disk device, an optical disk device, a solid-date drive, a flash drive, or some other large capacity storage device. For example, the storage device may store long-term data (e.g., database data, file system data, etc.). The input/output device 1840 provides input/output operations for the system 1800. In some implementations, the input/output device 1840 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 1860. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 1830 may be implemented in a distributed way over a network, for example as a server farm or a set of widely distributed servers, or may be implemented in a single computing device.

Although an example processing system has been described in FIG. 18, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; and magneto optical disks. The processor and the memory can be supplemented by, or incorporated in, special purpose logic circuitry.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Figure 19:
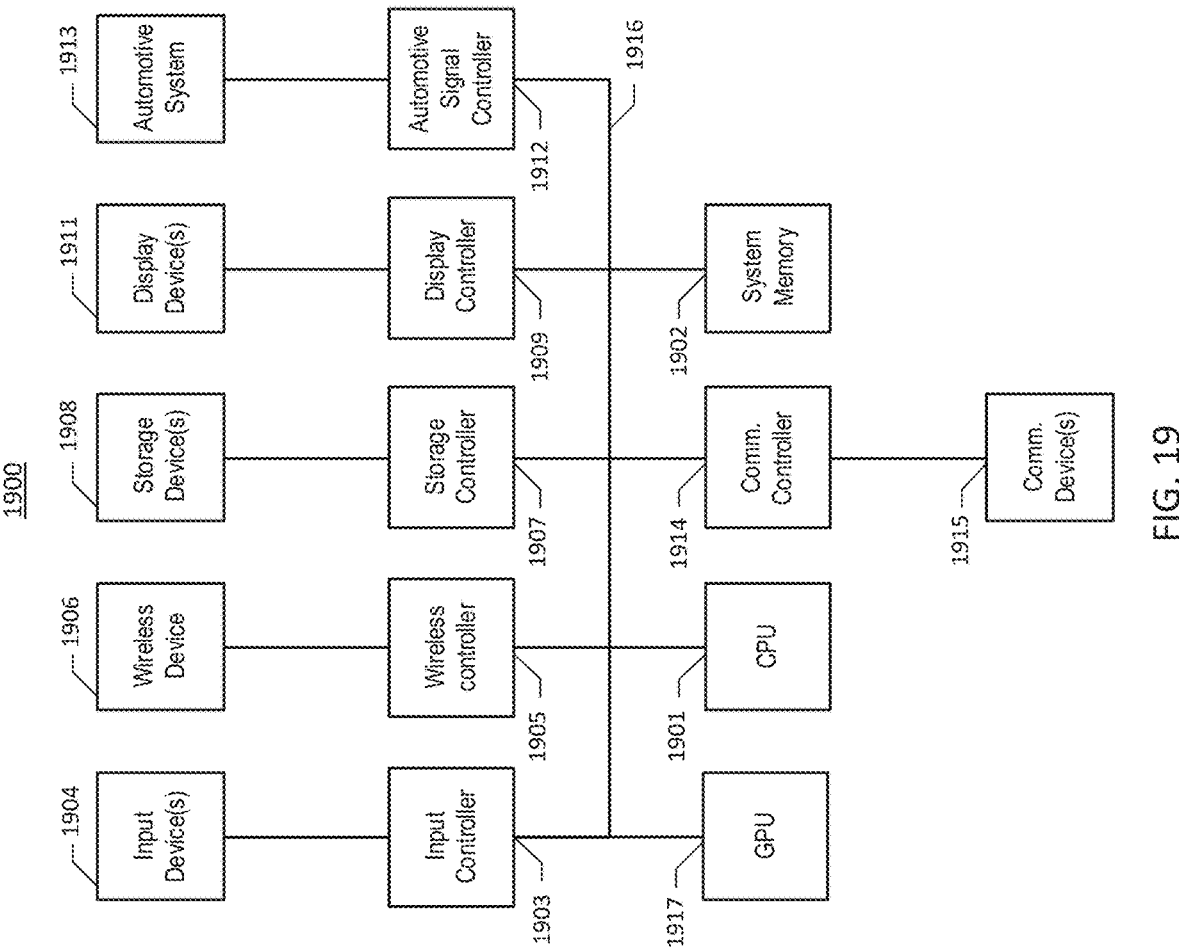
FIG. 19 is a block diagram of a computing device/information handling system, in accordance with some embodiments.

FIG. 19 depicts a simplified block diagram of a computing device/information handling system (or computing system) according to embodiments of the present disclosure. It will be understood that the functionalities shown for system 1900 may operate to support various embodiments of an information handling system—although it shall be understood that an information handling system may be differently configured and include different components.

As illustrated in FIG. 19, system 1900 includes one or more central processing units (CPU) 1901 that provides computing resources and controls the computer. CPU 1901 may be implemented with a microprocessor or the like, and may also include one or more graphics processing units (GPU) 1917 and/or a floating point coprocessor for mathematical computations. System 1900 may also include a system memory 1902, which may be in the form of random-access memory (RAM), read-only memory (ROM), or both.

A number of controllers and peripheral devices may also be provided, as shown in FIG. 19. An input controller 1903 represents an interface to various input device(s) 1904, such as a keyboard, mouse, or stylus. There may also be a scanner controller 1905, which communicates with a scanner 1906. System 1900 may also include a storage controller 1907 for interfacing with one or more storage devices 1908 each of which includes a storage medium such as magnetic tape or disk, or an optical medium that might be used to record programs of instructions for operating systems, utilities, and applications, which may include embodiments of programs that implement various aspects of the techniques described herein. Storage device(s) 1908 may also be used to store processed data or data to be processed in accordance with some embodiments. System 1900 may also include a display controller 1909 for providing an interface to a display device 1911, which may be a cathode ray tube (CRT), a thin film transistor (TFT) display, or other type of display. The computing system 1900 may also include an automotive signal controller 1912 for communicating with an automotive system 1913. A communications controller 1914 may interface with one or more communication devices 1915, which enables system 1900 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 1916, which may represent more than one physical bus. However, various system components may or may not be in physical proximity to one another. For example, input data and/or output data may be remotely transmitted from one physical location to another. In addition, programs that implement various aspects of some embodiments may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Some embodiments may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that some embodiments may further relate to computer products with a non-transitory, tangible computer-readable medium that have computer code thereon for performing various computer-implemented operations. The media and computer code may be those specially designed and constructed for the purposes of the techniques described herein, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Some embodiments may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the techniques described herein. One skilled in the art will also recognize that a number of the elements described above may be physically and/or functionally separated into sub-modules or combined together.

Terminology

The phrasing and terminology used herein are for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Although certain specific embodiments are described above for instructional purposes, the teachings of this disclosure have general applicability and are not limited to the specific embodiments described above. Accordingly, various modifications, adaptations, and combinations of various features of the described embodiments can be practiced without departing from the scope of the invention as set forth in the claims.

What is claimed is:

1. A light detection and ranging (LIDAR) device, comprising:

a plurality of laser sources configured to provide a plurality of transmit beams, each laser source of the plurality of laser sources being positioned on a planar substrate with a respective lateral offset of a first plurality of offsets relative to a reference line defined on the planar substrate;

a plurality of transmit/receive (T/R) interfaces configured to pass the plurality of transmit beams and reflect received light towards a plurality of detectors, each T/R interface of the plurality of T/R interfaces being positioned on the planar substrate with a respective lateral offset of a second plurality of offsets relative to the reference line; and a plurality of micro-optic lenses positioned between the plurality of laser sources and the plurality of T/R interfaces, each micro-optic lens of the plurality of micro-optic lenses being positioned on the planar substrate with a respective lateral offset of a third plurality of offsets relative to the reference line, wherein the respective lateral offsets of the first, second, and third pluralities of offsets are configured in a calculated relationship that provides non-mechanical beam steering of the plurality of transmit beams across a field of view, and wherein the non-mechanical beam steering is configured to align the plurality of transmit beams to a flat focal plane.

2. The LIDAR device of claim 1, wherein each lens of the plurality of micro-optic lenses intersects a respective transmit beam of the plurality of transmit beams, and wherein each lens of the plurality of micro-optic lenses includes one or more micro-optic lenses configured to provide beam shaping of the respective transmit beam of the plurality of transmit beams.

3. The LIDAR device of claim 1, wherein each T/R interface of the plurality of T/R interfaces includes at least one mirror.

4. The LIDAR device of claim 3, wherein each detector of the plurality of detectors is included in a respective T/R interface of the plurality of T/R interfaces.

5. The LIDAR device of claim 1, wherein the plurality of laser sources, the plurality of micro-optic lenses, and the plurality of T/R interfaces are all disposed on the planar substrate to form a single integrated optical unit.

6. A LIDAR system, comprising a plurality of LIDAR devices as recited in claim 5, wherein the plurality of transmit beams from each LIDAR device are aligned to the flat focal plane.

7. The LIDAR system of claim 6, wherein the calculated relationship of the lateral offsets for each LIDAR device is determined based on a position of each LIDAR device within the LIDAR system.

8. The LIDAR system of claim 7, wherein the planar substrate in each LIDAR device comprises silicon.

9. The LIDAR system of claim 7, wherein each LIDAR device in the LIDAR system corresponds to two or more channels of a plurality of channels of the LIDAR system.

10. The LIDAR system of claim 7, wherein the LIDAR system includes a system lens and the reference line corresponds to a center of the system lens.

11. The LIDAR system of claim 10, wherein the plurality of laser sources and the plurality of micro-optic lenses in each LIDAR device, as positioned, are configured to steer the plurality of transmit beams for each LIDAR device towards the center of the system lens.

12. The LIDAR system of claim 11, wherein the first plurality of offsets are larger than the third plurality of offsets and the third plurality of offsets are larger than the second plurality of offsets.

13. The LIDAR system of claim 10, wherein each LIDAR device is aligned using an active alignment process that includes energizing at least one laser source of the plurality of laser sources and measuring energy associated with at least one transmit beam of the plurality of transmit beams at the center of the system lens.

14. The LIDAR device of claim 1, wherein the first plurality of offsets correspond to a first pitch between the plurality of laser sources, the second plurality of offsets correspond to a second pitch between the plurality of T/R interfaces, and the third plurality of offsets correspond to a third pitch between the plurality of micro-optic lenses.

15. The LIDAR device of claim 14, wherein the plurality of laser sources are fabricated as a laser source array having the first pitch, the plurality of T/R interfaces are fabricated as a T/R interface array having the second pitch, and the plurality of micro-optic lenses are fabricated as a micro-optic lens array having the third pitch.

16. The LIDAR device of claim 15, wherein each of the laser source array, the T/R interface array, and the micro-optic lens array is a monolithic array component.

17. A method for operating a light detection and ranging (LIDAR) device, the method comprising:

providing a plurality of transmit beams via a plurality of laser sources positioned on a planar substrate, each laser source of the plurality of laser sources being positioned with a respective lateral offset of a first plurality of offsets relative to a reference line defined on the planar substrate;

conditioning the plurality of transmit beams via a plurality of lenses, each lens of the plurality of lenses being positioned with a respective lateral offset of a second plurality of offsets relative to the reference line; and passing the plurality of transmit beams and reflecting received light towards a plurality of detectors via a plurality of transmit/receive (T/R) interfaces, each T/R interface of the plurality of T/R interfaces being positioned on the planar substrate with a respective lateral offset of a third plurality of offsets relative to the reference line, wherein the respective lateral offsets of the first, second, and third pluralities of offsets are configured in a calculated relationship that provides non-mechanical beam steering of the plurality of transmit beams across a field of view, and wherein the non-mechanical beam steering is configured to align the plurality of transmit beams to a flat focal plane.

18. The method of claim 17, wherein each lens of the plurality of lenses intersects a respective transmit beam of the plurality of transmit beams, and wherein each lens of the plurality of lenses includes one or more micro-optic lenses and conditioning the plurality of transmit beams includes beam shaping the plurality of transmit beams using the micro-optic lenses.

19. The method of claim 17, wherein each T/R interface of the plurality of T/R interfaces includes at least one mirror.

20. The method of claim 19, wherein each detector of the plurality of detectors is included in a respective T/R interface of the plurality of T/R interfaces.

21. The method of claim 17, wherein the plurality of laser sources, the plurality of lenses, and the plurality of T/R interfaces are all disposed on the planar substrate to form a single integrated optical unit.

22. The method of claim 21, wherein the single integrated optical unit is one of a plurality of integrated optical units in a Lidar system and wherein a plurality of intergrated optical units in the Lidar system generate a plurality of transmit beams aligned to the flat focal plane.

23. The method of claim 22, wherein the calculated relationship of the lateral offsets for each Lidar device in the Lidar system is determined based on a position of each LIDAR device within the LIDAR system.

24. The method of claim 23, wherein the planar substrate in each LIDAR device comprises silicon.

25. The method of claim 23, wherein each LIDAR device in the Lidar system corresponds to two or more channels of a plurality of channels of the LIDAR system.

26. The method of claim 23, wherein the LIDAR system includes a system lens and the reference line corresponds to a center of the system lens.

27. The method of claim 26, wherein the plurality of laser sources and the plurality of lenses, as positioned, steer the plurality of transmit beams towards the center of the system lens.

28. The method of claim 26, wherein the first plurality of offsets are larger than the third plurality of offsets and the third plurality of offsets are larger than the second plurality of offsets.

29. The method of claim 26, further comprising aligning the LIDAR device using an active alignment process that includes energizing at least one laser source of the plurality of laser sources and measuring energy associated with at least one transmit beam of the plurality of transmit beams at the center of the system lens.

30. The method of claim 17, wherein the first plurality of offsets correspond to a first pitch between the plurality of laser sources, the second plurality of offsets correspond to a second pitch between the plurality of T/R interfaces, and the third plurality of offsets correspond to a third pitch between the plurality of lenses.

31. The method of claim 30, wherein the plurality of laser sources are fabricated as a laser source array having the first pitch, the plurality of T/R interfaces are fabricated as a T/R interface array having the second pitch, and the plurality of lenses are fabricated as a lens array having the third pitch.

32. The method of claim 31, wherein each of the laser source array, the T/R interface array, and the lens array is a monolithic array component.

33. A method for manufacturing a light detection and ranging (LIDAR) device, the method comprising:

providing a laser source array including a plurality of laser sources, each laser source disposed with a first pitch of the plurality of laser sources positioned on a first planar substrate with a respective lateral offset of a first plurality of offsets relative to a reference line defined on the planar substrate, the plurality of laser sources configured to provide a respective plurality of transmit beams, wherein providing the laser source array comprises positioning at least one laser source of the plurality of laser sources with a first offset relative to a reference line;

providing a transmit/receive (T/R) interface array including a plurality of T/R interfaces configured to pass the plurality of transmit beams and reflect received light towards a plurality of detectors, each T/R interface of the plurality of T/R interfaces being positioned on the planar substrate with a respective lateral offset of a second plurality of offsets relative to the reference line; and providing a micro-optic lens array including a plurality of micro-optic lenses disposed positioned between the plurality of laser sources and the plurality of T/R interfaces, each micro-optic lens of the plurality of micro-optic lenses being positioned on the planar substrate with a respective lateral offset of a third plurality of offsets relative to the reference line, with a second pitch on a second substrate, the plurality of lenses configured to condition the respective plurality of transmit beams provided by the laser source array, wherein providing the lens array comprises positioning at least one lens of the plurality of lenses with a second offset relative to the reference line; and providing a transmit/receive (T/R) interface array including a plurality of T/R interfaces disposed with a third pitch on a third substrate, the plurality of T/R interfaces configured to pass the respective plurality of transmit beams conditioned by the lens array and to reflect received light towards a plurality of detectors, wherein providing the T/R interface array comprises positioning at least one T/R interface of the plurality of T/R interfaces with a third offset relative to the reference line, wherein the laser source array and the lens array, as positioned, are configured to provide beam steering of one or more of the plurality of transmit beams wherein the respective lateral offsets of the first, second, and third pluralities of offsets are configured in a calculated relationship that provides non-mechanical beam steering of the plurality of transmit beams across a field of view, and wherein the non-mechanical beam steering is configured to align the plurality of transmit beams to a flat focal plane.

34. The method of claim 33, further comprising:

fabricating the plurality of laser sources as the laser source array having a first pitch;

fabricating the plurality of micro-optic lenses as the micro-optic lens array having a second pitch; and fabricating the plurality of T/R interfaces as the T/R interface array having a third pitch.

35. The method of claim 34, wherein each of the laser source array, the T/R interface array, and the micro-optic lens array is fabricated as a monolithic array component.

* * * * *